United States Patent
Koda et al.

(10) Patent No.: US 7,440,375 B2
(45) Date of Patent: Oct. 21, 2008

(54) INFORMATION RECORDING DEVICE AND METHOD

(75) Inventors: Takeshi Koda, Saitama (JP); Keiji Katata, Saitama (JP); Masayoshi Yoshida, Saitama (JP)

(73) Assignee: Pioneer Corporation, Tokyo (JP)

( * ) Notice: Subject to any disclaimer, the term of this patent is extended or adjusted under 35 U.S.C. 154(b) by 178 days.

(21) Appl. No.: 10/551,965

(22) PCT Filed: Feb. 28, 2005

(86) PCT No.: PCT/JP2005/003289

§ 371 (c)(1),
(2), (4) Date: Jul. 5, 2006

(87) PCT Pub. No.: WO2005/086162

PCT Pub. Date: Sep. 15, 2005

(65) Prior Publication Data

US 2006/0291338 A1 Dec. 28, 2006

(30) Foreign Application Priority Data

Mar. 3, 2004 (JP) .............................. 2004 059831

(51) Int. Cl.
*G11B 7/00* (2006.01)

(52) U.S. Cl. .................. 369/53.2; 369/53.24; 369/47.4; 369/47.5; 369/275.1

(58) Field of Classification Search ........................ None
See application file for complete search history.

(56) References Cited

U.S. PATENT DOCUMENTS

| | | | |
|---|---|---|---|
| 6,631,106 B1 * | 10/2003 | Numata et al. ............ | 369/53.17 |
| 7,082,092 B2 * | 7/2006 | Weijenbergh et al. ..... | 369/59.25 |
| 7,260,039 B2 * | 8/2007 | Suh ......................... | 369/53.17 |

FOREIGN PATENT DOCUMENTS

| | | |
|---|---|---|
| JP | 2003-217232 | 7/2003 |
| JP | 2003-323767 | 11/2003 |
| JP | 2005-011482 | 1/2005 |
| WO | 2003/038823 | 5/2003 |

* cited by examiner

*Primary Examiner*—Muhammad N. Edun
(74) *Attorney, Agent, or Firm*—Young & Thompson

(57) ABSTRACT

There is provided an information recording device for recording record information onto an information recording medium having a plurality of recording layers. The information recording device includes: write elements capable of writing record information into the recording layers; control elements for controlling the write elements to write first boundary information or second boundary information (107a-0) having a smaller recording capacity than the first boundary information at the end of record information recorded in one of the recording layers; and detection elements for detecting an empty capacity of the data area in that recording layer. The control elements controls the write elements to write the first boundary information at the end if the empty capacity is equal to or greater than a first threshold value and the second boundary information at the end if the detected empty capacity is smaller than the first threshold value.

9 Claims, 17 Drawing Sheets

FIG. 4

| Sector Number of Start Position of Border Zone | 3FF00h~B25FFh (Inner) | B2600h~1656FFh (Middle) | 165700h~ (Outer) |
|---|---|---|---|
| First Border Zone | 1792 ECC 56MBytes | 2368 ECC 74MB | 2944 ECC 92MB |
| Second or more Border Zone | 384ECC 12MB | 480 ECC 15MB | 608 ECC 19MB |

INFORMATION RECORDING DEVICE AND METHOD

TECHNICAL FIELD

The present invention relates to an information recording apparatus and method, such as a DVD recorder.

BACKGROUND ART

For example, in the information recording medium, such as a CD and a DVD, there are developed a multiple layer or multilayer type, or dual layer type optical disc and so on, in which a plurality of recording layers are laminated on the same substrate, as described in patent documents 1, 2, and the like. On an information recording apparatus, such as a DVD recorder, for recording information onto such a dual layer type (i.e. two-layer type) optical disc, laser light for recording is focused onto a recording layer located on the front or the closest side (referred to as an "L0 layer", as occasion demands, in the application), as viewed from a laser light irradiation or emission side, to thereby record the information into the L0 layer in a rewritable method or irreversible change recording method by heat or the like. Then, the laser light is focused onto a recording layer located on the rear or farther side (referred to as an "L1 layer", as occasion demands, in the application), as viewed from the laser light irradiation side, through the L0 layer and the like, to thereby record the information into the L1 layer in a rewritable method or irreversible change recording method by heat or the like.

On the other hand, there is also disclosed a technology of performing the recording or reproduction in an "opposite manner" or "parallel manner" with respect to the L0 layer and the L1 layer. The "opposite manner" herein is a recording or reproducing manner in which the directions of the track passes are opposite between the two recording layers. As opposed to this, the "parallel manner" is a recording or reproducing manner in which the directions of the track passes are the same between the two recording layers Alternatively, in the optical disc, such as a DVD-R and a DVD-RW, a so-called border zone is defined. The border zone herein is a buffer area to prevent an unrecorded area from adjacently laying immediately after an area in which the information, such as data, is recorded. More specifically, if there is this unrecorded area on the DVD-R optical disc, it is hardly possible or completely impossible to control tracking servo, with respect to a DVD-R drive in which a push-pull method is adopted, by using an optical pickup of a DVD-ROM reproduce-only drive in which a phase difference method is adopted.

The recording process of this border zone is generally referred to as a border close process.

By virtue of the border close process, it is possible to read the information on the DVD-R optical disc, by using the DVD-ROM reproduce-only drive. Moreover, as in a multi session in a CD-R or the like, for example, a recording operation, such as additional or postscript recording, can be performed a plurality of times on the DVD-R optical disc. At the same time, such a function, which is a so-called multi border function, that a useless buffer area can be reduced, as compared to another type of multi session method in which a lead-in and a lead-out are recorded every time on the recording operation, can be realized. By virtue of the multi border function, the DVD-ROM reproduce-only drive can read the information on the DVD-R optical disc which holds reproduction compatibility on the DVD-ROM reproduce-only drive.

Patent document 1: Japanese Patent Application Laid Open NO. 2000-311346

Patent document 2: Japanese Patent Application Laid Open NO. 2001-23237

Patent document 3: Japanese Patent Application Laid Open NO. Hei 9-16966

DISCLOSURE OF INVENTION

Object to be Solved by the Invention

However, if the border zone is bridged and recorded over the L0 layer and the L1 layer, for example, in the case of the opposite manner, a middle area is already disposed in the L1 layer as a buffer area, so that the border zone which originally functions as the buffer area is unnecessary in the L1 layer.

On the other hand, even in the parallel manner, the lead-in area is already disposed in the L1 layer as a buffer area, so that the border zone which originally functions as the buffer area is unnecessary in the L1 layer.

A described above, if the border zone is bridged and recorded over the L0 layer and the L1 layer, the border zone of the L1 layer functions as a redundant buffer area, which is unnecessary. Nevertheless, it has technical problems that it wastes the recording capacity of the optical disc and that it extends a time length for the border close process.

It is therefore an object of the present invention to provide an information recording apparatus and method capable of efficiently recording information in each recording layer of a multi layer type information recording medium, and capable of reducing a recording time length.

Means for Solving the Object

Information Recording Apparatus

Hereinafter, the information recording apparatus of the present invention will be discussed.

The above object of the present invention can be achieved by an information recording apparatus for recording record information onto an information recording medium having a plurality of recording layers, the information recording apparatus provided with: a writing device capable of writing the record information into the plurality of recording layers; a controlling device for controlling the writing device to write first border information or second border information with a smaller recording capacity than that of the first border information, at an end of the record information recorded into one recording layer of the plurality of recording layers; and a detecting device for detecting a spare capacity of a data area of the one recording layer, the controlling device controlling the writing device to write the first border information (a normal border-out) at the end if the detected spare capacity is equal to or greater than a first threshold value ("2938" ECC blocks), and controlling the writing device to write the second border information (a layer border-out) at the end if the detected spare capacity is less than the first threshold value.

According to the information recording apparatus of the present invention, the targeted information recording medium has the plurality of recording layers, which include at least one recording layer (e.g. an L0 layer) and another recording layer (e.g. an L1 layer) and which are laminated on a disc-shaped substrate, for example. At the same time, the information recording medium has a buffer area, such as a middle area and a lead-in area, in a predetermined portion in the one and another recording layers, in order to perform the layer jump of a recording or reproduction position from the one recording layer to the another recording layer.

By virtue of such construction, upon recording onto the information recording medium, a plurality of record information to be recorded is recorded by the writing device, such as an optical pickup, in a recording operation, such as additional or postscript writing, in order, into the one recording layer, in a recording direction from one to the other side out of the inner and outer circumferential sides of the substrate. Then, the layer jump is performed in the buffer area. At the same time, the recording operation is performed in order, in another recording area, with the recording direction turned back in an opposite manner, or with the recording direction remaining as it is in a parallel manner.

The controlling device, such as a CPU, controls the writing device to record the record information in order, into the one and another recording layers. At the same time, in the border close process, the controlling device controls the writing device to write the border information from a position which indicates the end of the record information recorded in the one recording layer. The "border information" herein is so-called information about a border-out which indicates a border between a plurality of record information every time the writing of the plurality of record information to be recorded is ended.

Then, the detecting device, such as the CPU, detects the writable spare capacity other than the buffer area which is left in one recording area in such a condition that the record information, recorded in the one recording layer, is left as it is, if the border information, such as a border-out, is bridged and recorded over the one recording layer and the another recording layer.

Then, the controlling device, such as the CPU, may judge whether or not the spare capacity is equal to or greater than the first threshold value set in advance. The "first threshold value" of the present invention herein is the recording capacity of the "normal border-out". The recording capacity of the "normal border-out" varies depending on a start position to record, and if it is recorded for the first time, a border-out which is relatively long in the radial direction is recorded. On the other hand, if it is recorded for the second or more time, a border-out which is relatively short in the radial direction is recorded. Specifically, for example, in the border close process performed for the first time on the outer circumferential side of the recording area of the optical disc, the recording capacity of the normal border-out is "2938" ECC blocks. In the border close process performed for the second or more time, it is "602" ECC blocks. More specifically, in the normal border close process on the outer circumferential side of the recording area of the optical disc, the recording capacity of the border zone (i.e. an area in which the border-out and a border-in are recorded) recorded for the first time is 2944−5−1="2938" ECC blocks, wherein "2944" ECC blocks are defined to make the length in the radial direction of the border zone about 0.5 mm, "5" ECC blocks are the recording capacity of the border-in, and "1" ECC block is the recording capacity of a margin in the case of a linking size of 2 KB. On the other hand, the recording capacity of the border zone recorded for the second or more time is calculated in the same manner to be 608−5−1="602" ECC blocks, wherein "608" ECC blocks are defined to make the length in the radial direction of the border zone about 0.1 mm.

Then, the controlling device, such as the CPU, controls the writing device to write the first border information as the border information if it is judged that the spare capacity is equal to or greater than the first threshold value, wherein the first border information includes buffer data for stopping the recording or reproduction position at the end, upon recording or reproduction of the information recording medium and, and the first border information has recording capacity of the first threshold value or less. The "first border information" of the present invention herein is the border information recorded as the above-mentioned "normal border-out". More specifically, the first border information is provided with: data for recording management, such as the newest RMD (Recording Management Data); a stop block for preventing the runaway of an optical pickup; marker information which indicates whether or not the record information is recorded next to the first border information; and the buffer data. The recording capacity of the first border information is the same as that of the above-mentioned normal border-out, and is "2938" or "602" ECC blocks.

On the other hand, for example, the controlling device, such as the CPU, controls the writing device to write the second border information as the border information if it is judged that the spare capacity is less than the first threshold value, wherein the second border information includes less buffer data than the first border information does. The "second border information" of the present invention herein is the border information which protrudes and is recorded to the start position of the buffer area, or into the buffer area, such as a middle area and a lead-in area, for example, in one recording area, if the border information is bridged and recorded over the one recording layer and the another recording layer. More specifically, the second border information is provided with; the above-mentioned data for recording management, such as the newest RMD; the marker information which indicates whether or not the record information is recorded next to the second border information; and the buffer data. The recording capacity of the second border information is variable. For example, the minimum value thereof may be "43" ECC blocks, and the maximum value thereof may be "2937" ECC blocks, which is "1" ECC block less than the recording capacity of the normal border-out on the outer circumferential side of the recording area of the optical disc. Hereinafter, in the application, the second information is also referred to as a "layer border-out" or "layer to layer border-out", as occasion demands.

Consequently, according to the information recording apparatus of the present invention, if the border information, such as the border-out, is bridged and recorded over the one recording layer and the another recording layer, it is possible to efficiently or completely prevent the border information, such as the border-out, of the another recording layer from functioning as the redundant buffer area in addition to the original buffer area, such as the middle area and the lead-in area. If the border information, such as the border-out, is bridged and recorded over the one recording layer and the another recording layer, the border-out of the another recording layer functions as the redundant buffer area, and is unnecessary. Nevertheless, it wastes the recording capacity of the optical disc and it extends the time length for the border close process. As opposed to this, according to the present invention, a smaller recording capacity of the second border information, such as the layer border-out, than that of the first border information, such as the normal border-out, is recorded into the one recording layer and it is efficiently or completely prevented to record the border information, such as the border-out into another recoding layer. By this, it is possible to efficiently or completely prevent the border information, such as the border-out, of the another recording layer from functioning as the redundant buffer area. Thus, it is possible to prevent a waste of the recording capacity of the optical disc, and also greatly reduce the time length for the border close process.

In one aspect of the information recording apparatus of the present invention, the first threshold value is equal to the recording capacity of the first border information.

According to this aspect, under the controlling device, it is possible to compare the spare capacity and the first threshold value, accurately and quickly.

In another aspect of the information recording apparatus of the present invention, the controlling device controls the writing device to write the first border information, bridging over a space area of the data area of the one recording layer and a data area of another recording layer of the plurality of recording layers, if the detected spare capacity is less than a second threshold value ("43" ECC blocks) which is smaller than the first threshold value.

According to this aspect, under the control of the controlling device, such as the CPU, if it is judged that the spare capacity is less than the second threshold value which is smaller than the above-mentioned first threshold value, the first border information is bridged and written by the writing device over the space area of the data area of the one recording layer and the data area of the another recording layer. The "second threshold value" of the present invention herein is a minimum value of the recording capacity of the second border information, which is set to have a value equal to or greater than the recording capacity of the second border information. Specifically, it is "43" ECC blocks. More specifically, the minimum value of the recording capacity of the second border information is the sum of the recording capacity ("5" ECC blocks) of the data for recording management, such as the newest RMD, the recording capacity (3×"2" ECC blocks) of the marker information which indicates whether or not the record information is recorded next to the second border information, and the recording capacity (4×"8" ECC blocks) of the buffer data.

Consequently, the second border information, such as the layer border-out, is not recorded into the buffer area, such as the middle area and the lead-in area, in the one recording layer, for example, and the data structure of the buffer area is not changed, so that it is possible to stabilize the reproduction operation of an existing information recording/reproducing apparatus.

In this aspect, the second threshold value may be equal to the recording capacity of the second border information.

By virtue of such construction, under the control of the controlling device, it is possible to compare the spare capacity and the second threshold value, more accurately and quickly. At the same time, it is possible to realize more highly accurate control.

In another aspect of the information recording apparatus of the present invention, the controlling device controls the writing device to write the second border information, bridging over a space area of the data area of the one recording layer and a buffer area formed on an outer circumferential side of the data area, if the detected spare capacity is less than the second threshold value ("43" ECC blocks).

According to this aspect, at least the data for recording management (a recording capacity of "5" ECC blocks), such as the newest RMD, out of the second border information, such as the layer border-out, for example, can be recorded into the data area of the one recording layer. Moreover, for example, the protrusion (a recording capacity of "38" ECC blocks at most) of a next border marker, buffer data, and the like, can be recorded into the buffer area, such as the middle area and the lead-out area, formed on the outer circumferential side of the data area of the one recording layer.

Therefore, it is possible to prevent the border information, such as the border-out, of the another recording area from functioning as the redundant buffer area, more efficiently or completely.

Moreover, at least the data for recording management, such as the newest RMD, is recorded into the data area of the one recording layer, so that there is such an advantage that it is possible to improve the reliability of the information recorded on the optical disc by the information recording apparatus.

In addition, it is possible to minimize a change in the data structure of the buffer area by minimizing the possibility that the second border information, such as the layer border-out, is recorded into the buffer area, such as the middle area and the lead-in area. Thus, it is possible to stabilize the reproduction operation of the existing information recording/reproducing apparatus.

In this aspect, the controlling device may control the writing device to write the first border information, bridging over the space area and a data area of the another recording layer, if the detected spare capacity is less than a third threshold value which is smaller than the second threshold value.

By virtue of such construction, under the control of the controlling device, such as the CPU, if it is judged that the spare capacity is less than the third threshold value which is smaller than the above-mentioned second threshold value, the first border information is bridged and written by the writing device over the space area of the data area of the one recording layer and the data area of the another recording layer. The "third threshold value" of the present invention herein is the recording capacity ("5" ECC blocks) of the data for recording management, such as the newest RMD, which is one of the constitutional elements of the above-mentioned second border information.

Consequently, the second border information, such as the layer border-out, is not recorded into the buffer area, such as the middle area and the lead-in area, in the one recording layer, for example, and the data structure of the buffer area is not changed, so that it is possible to stabilize the reproduction operation of the existing information recording/reproducing apparatus.

Moreover, in this aspect, the third threshold value may be equal to a recording capacity of data for recording management which is located at a head of the second border information.

By virtue of such construction, under the control of the controlling device, it is possible to compare the spare capacity and the third threshold value, more accurately and quickly. At the same time, it is possible to realize more highly accurate control.

In another aspect of the information recording apparatus of the present invention, the second border information does not include a stop block which is included in the first border information.

According to this aspect, it is possible to reduce the recording capacity of the second border information, by the recording capacity of the stop block ("2×2=4" ECC blocks). Thus, it is possible to prevent the border information, such as the border-out, of the another recording area from functioning as the redundant buffer area, more efficiently or completely.

Information Recording Method

Hereinafter, the information recording method of the present invention will be discussed.

The above object of the present invention can be also achieved by an information recording method in an information recording apparatus provided with a writing device capable of writing record information into a plurality of recording layers with respect to an information recording medium having the plurality of recording layers, the information recording method provided with: a controlling process of controlling the writing device to write first border information or second border information with a smaller recording capacity than that of the first border information, at an end of the record information recorded into one recording layer of the plurality of recording layers; and a detecting process of detecting a spare capacity of a data area of the one recording layer, the controlling process controlling the writing device to write the first border information (the normal border-out) at the end if the detected spare capacity is equal to or greater than a first threshold value ("2938" ECC blocks), and controlling the writing device to write the second border information (the layer border-out) at the end if the detected spare capacity is less than the first threshold value.

According to the information recording method of the present invention, as in the case of the above-mentioned information recording apparatus of the present invention, the writing device records a smaller recording capacity of the second border information, such as the layer border-out, than that of the first border information, such as the normal border-out, is recorded into the one recording layer, and it is efficiently or completely prevented to record the border information, such as the border-out into another recoding layer, under the control of the controlling process, in accordance with the result of the detecting process. By this, it is possible to efficiently or completely prevent the border information, such as the border-out, of the another recording layer from functioning as the redundant buffer area. Thus, it is possible to prevent a waste of the recording capacity of the optical disc, and also greatly reduce the time length for the border close process.

Incidentally, in response to the various aspects of the information recording apparatus of the present invention described above, the information recording method of the present invention can adopt various aspects.

Computer Program

Hereinafter, the computer program of the present invention will be discussed.

The above object of the present invention can be also achieved by a computer program of instructions for recording control and for tangibly embodying a program of instructions executable by a computer provided in the above-mentioned information recording apparatus of the present invention (including its various aspects), to make the computer function as at least one of the controlling device, the detecting device, and the writing device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the information recording apparatus of the present invention described above, the computer program of the present invention can adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one of the controlling device, the detecting device, and the writing device.

According to the computer program product of the present invention, at least one of the controlling device, the detecting device, and the writing device of the present invention can be embodied relatively readily, by loading the computer program product from a recording medium for storing the computer program product, such as a ROM (Read Only Memory), a CD-ROM (Compact Disc—Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one of the controlling device, the detecting device, and the writing device.

These effects and other advantages of the present invention become more apparent from the following embodiments.

As explained above, according to the information recording apparatus of the present invention is provided with: the controlling device; and the detecting device. According to the information recording method of the present invention is provided with: the controlling process; and the detecting process. Thus, it is possible to efficiently or completely prevent the border information, such as the border-out, from functioning as the redundant buffer area. Moreover, according to the computer program of the present invention, it makes a computer function as the above-mentioned information recording apparatus of the present invention. Thus, it is possible to efficiently or completely prevent the border information, such as the border-out, from functioning as the redundant buffer area.

BRIEF DESCRIPTION OF DRAWINGS

FIG. 4 is a table showing the physical recording capacity of a normal border zone in an L0 layer of the two-layer type optical disc, such as a DVD-R, targeted for the recording by an information recording/reproducing apparatus in the first embodiment of the information recording apparatus of the present invention.

DESCRIPTION OF REFERENCE CODES

100 . . . Optical disc,
101-0 (101-1) . . . Lead-in area,
102-0 (102-1) . . . Data zone,
103-0 (103-1 or 103-1a) . . . Lead-out area,
104-(104-1) . . . Middle area,
105-0 (105-1) . . . Border zone,
105a-0 (105a-1) . . . Border-out (for 0.5 mm),
105b-0 (105b-1) . . . Border-in,
105c-0 (105c-1) . . . Border-out (for 0.1 mm),
105d-0 (105d-1) . . . Border RMD area,
106-0 (106-1) . . . Border (Bordered area),
107a-0 . . . Layer border-out,
300 . . . Information recording/reproducing apparatus,
306 . . . Data input/output control device,
307 . . . Operation control device,
310 . . . Operation button,
311 . . . Display panel,
351 . . . Spindle motor,
352 . . . Optical pickup,
353 . . . Signal recording/reproducing device,
354 . . . CPU (Drive control device),
355 . . . Memory,
LB . . . Laser light

BEST MODE FOR CARRYING OUT THE INVENTION

The best mode for carrying out the present invention will be discussed for each embodiment in order with reference to the drawings.

Figure 1:
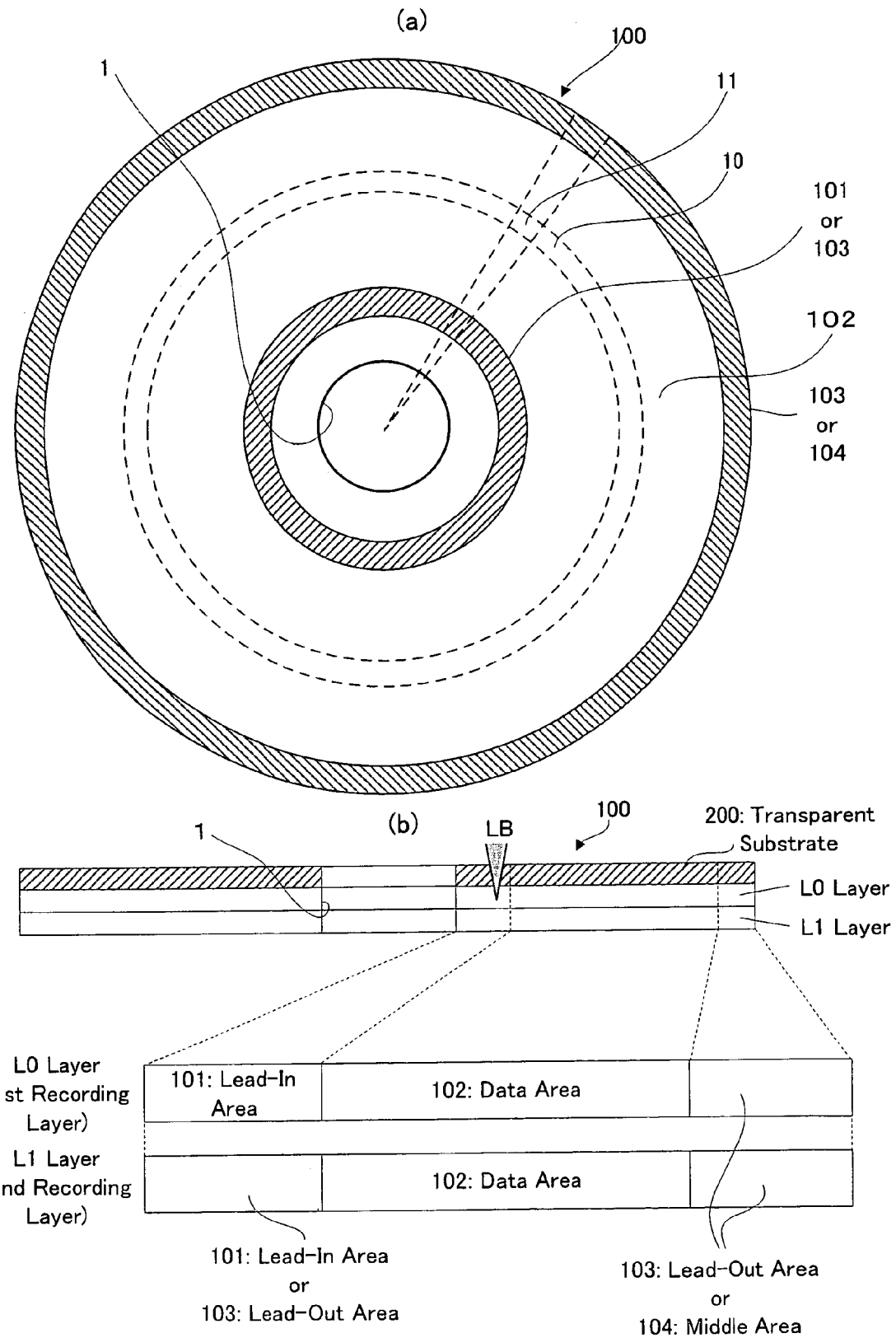
FIG. 1(a) is a substantial plan view showing the basic structure of an optical disc having a plurality of recording areas, as being an information recording medium targeted for the recording by a first embodiment of the information recording apparatus of the present invention.
FIG. 1(b) is a schematic cross sectional view of the optical disc and a corresponding conceptual diagram showing a recording area structure in the radial direction.

Information Recording Medium Targeted by First Embodiment of Information Recording Apparatus With reference to FIG. 1 to FIG. 3, an optical disc associated with the information recording medium targeted for recording by a first embodiment of the information recording apparatus of the present invention will be discussed in detail.

At first, with reference to FIG. 1(a) and FIG. 1(b), the basic structure of the information recording medium, targeted for the recording operation by the first embodiment of the information recording apparatus of the present invention, will be discussed. FIG. 1(a) is a substantial plan view showing the basic structure of an optical disc having a plurality of recording areas, as being an information recording medium targeted for the recording by a first embodiment of the information recording apparatus of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 101; a data area 102; and a lead-out area 103 or a middle area 104, with a center hole 1 as the center. Then, for example, on a transparent substrate 200 of the optical disc 100, there are laminated or pasted recording layers and the like. In each recording area of the recording layers, tracks 10, such as groove tracks and land tracks, are alternately placed, spirally or concentrically, with the center hole 1 as the center. On the track 10, data is divided and recorded by a unit of ECC block 11. The ECC block 11 is a data management unit by a pre-format address in which record information is error-correctable.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

Particularly, the optical disc 100 in the embodiment, as shown in FIG. 1(b), has such a structure that an L0 layer and an L1 layer, which constitute one example of the one and another record layers of the present invention as described later, respectively, are laminated on the transparent substrate. Upon the recording/reproduction of such a two-layer type optical disc 100, the recording/reproduction in the L0 layer or the L1 layer is performed, depending on which recording layer has the focus position of laser light LB, irradiated from the upper to the lower side in FIG. 1(b). Moreover, the optical disc 100 in the embodiment is not limited to a two-layer single sided type, i.e., a dual layer type, but may be a two-layer double sided type, i.e., a dual layer double sided type. Furthermore, the optical disc 100 in the example is not limited to the optical disc having the two recording layers, as described above, but may be an optical disc of a multilayer type which has three or more layers.

Incidentally, a recording/reproducing procedure in an opposite track pass manner or parallel track pass manner in the two-layer type optical disc, and the data structure of each layer will be discussed later.

Next, with reference to FIG. 2, the data structure of the two-layer type optical disc associated with the information recording medium targeted for the recording by the first embodiment of the information recording apparatus of the present invention, a physical sector number constituting an ECC block in the recording area of the optical disc, and a recording or reproducing method in an opposite manner of the optical disc will be discussed. The physical sector number (hereinafter referred to as a "sector number") herein is position information which indicates an absolute physical address in the recording area of the optical disc. FIG. 2 is a schematic graph showing the data structure of the two-layer type optical disc associated with the information recording medium targeted for the recording by the first embodiment of an information recording apparatus of the present invention, the physical sector number constituting an ECC block in the recording area of the optical disc, and the recording or reproducing method in the opposite manner of the optical disc. The vertical axis indicates the sector number expressed by hexadecimal number, and the horizontal axis indicates a relative position in the radial direction of the optical disc.

Figure 2:
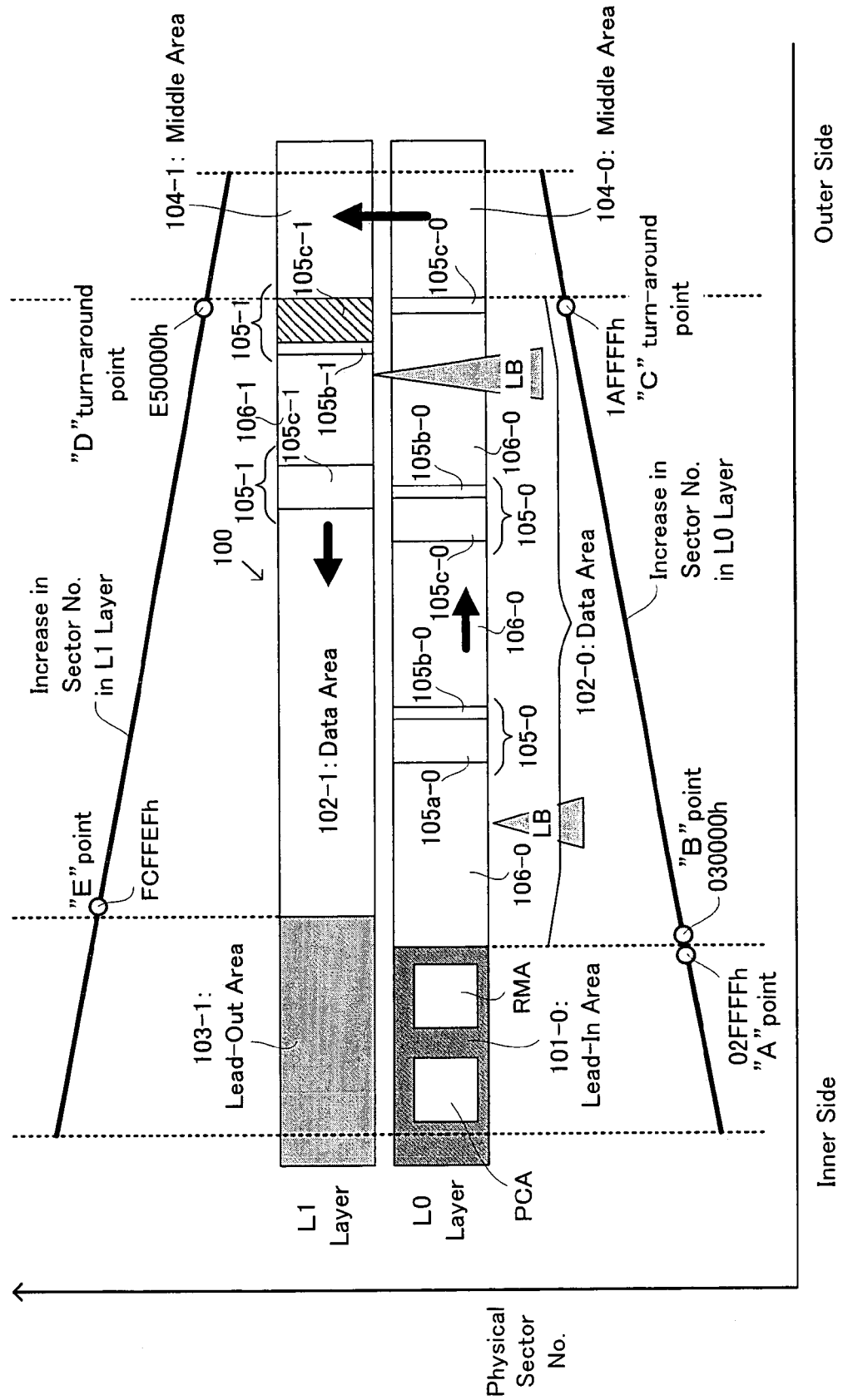
FIG. 2 is a schematic graph showing the data structure of a two-layer type optical disc associated with an information recording medium targeted for the recording by the first embodiment of an information recording apparatus of the present invention, a physical sector number constituting an ECC block in the recording area of the optical disc, and a recording or reproducing method in an opposite manner of the optical disc.

As shown in FIG. 2, the two-layer type optical disc 100 targeted for the recording by the first embodiment of the information recording apparatus of the present invention is provided with: the above-mentioned substrate; and the two recording layers laminated on the substrate, i.e. the L0 layer and the L1 layer.

Specifically, the L0 layer is provided with: a lead-in area 101-0; a data area 102-0; and a middle area 104-0, from the inner to the outer circumferential side. In the lead-in area 101-0 or the inner portion thereof, there are provided a PC (Power Calibration) area PCA for an OPC (Optimum Power Calibration) process, an RM (Recording Management) area RMA in which recording management information is recorded, and the like. Incidentally, the PC area and the RM area may be located on the disc inner circumferential side in the lead-in area 101. In particular, the data area 102-0 is provided with three bordered areas 106-0 (herein after referred to a "border", as occasion demands), for example, by a border zone 105-0; a border-out 105a-0 or 105c-0. Each border zone 105-0 is provided with: the border-out 105a-0 with a length of 0.5 mm in the radial direction (or 105c-0 with a length of 0.1 mm) and a border-in 105b-0.

On the other hand, the L1 layer is provided with: a middle area 104-1; a data area 102-1; and a lead-out area 103-1, from the outer to the inner circumferential side. A not-illustrated OPC area or the like may be located even in the lead-out area 103-1. In particular, the data area 102-1 is also provided with: a border zone 105-1; and a border-out 105c-1, from the outer circumferential side, for example, and is provided with a border 106-1 between them. Each border zone 105-1 is provided with: a border-out 105a-1 with a length of 0.5 mm in the radial direction (or 105c-1 with a length of 0.1 mm) and a border-in 105b-1, as in the L0 layer.

Since the two-layer type optical disc is constructed in the above manner, in recording or reproduction of the optical disc 100, the laser light LB is irradiated from a not-illustrated substrate's side, i.e., from the lower to the upper side in FIG. 2, by a not-illustrated optical pickup of an information recording/reproducing apparatus in the first embodiment of the information recording apparatus of the present invention, and the focal distance thereof or the like is controlled as well as the travel distance and direction in the radial direction of the optical disc 100. By this, the data is recorded into each recording layer, or the recorded data is reproduced.

In particular, the opposite manner is adopted as the recording or reproducing procedure of the two-layer type optical disc associated with the information recording medium targeted for the recording by the first embodiment of the information recording apparatus of the present invention. More specifically, the opposite manner herein is such a manner that the optical pickup of the information recording/reproducing apparatus in the first embodiment is displaced from the inner to the outer circumferential side, i.e. in a direction of a right-pointing arrow in FIG. 2, in the L0 layer as the recording or reproducing procedure of the two-layer type optical disc, while the optical pickup is displaced from the outer to the inner circumferential side, i.e. in a direction of a left-pointing arrow in FIG. 2, in the L1 layer, to thereby perform the recording or reproduction on the two-layer type optical disc. In the opposite manner, if the recording or reproduction is ended in the L0 layer, the optical pickup, located on the most outer circumference, does not need to be displaced to the most inner circumference when the recording or reproduction is started in the L1 layer, and it is enough if only the focal distance from the L0 layer to the L1 layer is changed. Thus, there is an advantage that a changing time form the L0 layer to the L1 layer is shorter than that in the parallel manner. This is why the opposite manner is adopted in the recording of large volumes of content information, which requires a real time feature upon recording and reproduction of video data or the like.

Specifically, at first, in the L0 layer, as the optical pickup is displaced in the lead-in area 101-0, the data area 102-0, and the middle area 104-0, from the inner to the outer circumferential side, the sector number in the recording area of the optical disc 100 increases. More specifically, the optical pickup sequentially accesses the end position of the lead-in area 101-0 with a sector number of "02FFFFh" (refer to an A point in FIG. 2), the start position of the data area 102-0 with a sector number of "030000h" (refer to a B point in FIG. 2), and the end position of the data area 102-0 with a sector number of "1AFFFFh" (hereinafter referred to as a "turn-around point" in the L0 layer, as occasion demands: refer to a C point in FIG. 2), and the optical pickup is displaced to the middle area 104-0 which functions as the buffer, by which the recording or reproduction is performed in the L0 layer. Incidentally, in the embodiment, "h" which is the end of "3000h" or the like indicates that it is expressed by hexadecimal number. On the other hand, in the L1 layer, specifically, as the optical pickup is displaced in the middle area 104-1, the data area 102-1, and the lead-out area 103-1 from the outer to the inner circumferential side, the sector number in the recording area of the optical disc 100 increases. More specifically, the optical pickup sequentially accesses the middle area 104-1 which functions as the buffer, the start position of the data area 102-1 with a sector number of "E50000h" (hereinafter referred to as a "turn-around point" in the L1 layer, as occasion demands: refer to a D point in FIG. 2), and the end position of the data area 102-1 with a sector number of "FCFFEFh" (refer to an E point in FIG. 2), and the optical pickup is displaced to the lead-out area 103-1, by which the recording or reproduction is performed in the L1 layer.

All the sector numbers in the L0 layer and the L1 layer explained above have a 15's complement number relationship in the hexadecimal number. More specifically, the turn-around point in the L0 layer (the sector number of "1AFFFFh") and the turn-around point in the L1 layer (the sector number of "E50000h") have the 15's complement number relationship. As a formal matter, the complement number of the "1AFFFFh" is obtained by converting the sector number of "1AFFFFh" in the hexadecimal number to a binary number of "000110101111111111111111", inverting the bits to "111001010000000000000000", and reconverting it to the "E50000h" in the hexadecimal number.

Thus, the content information is recorded or reproduced at the same time that the optical pickup is continuously displaced, in the sector numbers of "030000h" to "1AFFFFh" of the data area 102-0 in the L0 layer and the sector numbers of "E50000h" to "FCFFEFh" of the data area 102-1 in the L1 layer, for example.

With respect to the physical sector number explained above, a Logical Block Address (LBA) is assigned, one to one. More specifically, for example, a "000000h" LBA corresponds to the sector number of "030000h", and a "30FFEFh" LBA corresponds to the sector number of "FCFFEFh". Incidentally, the further consideration of the operational effect of the first embodiment of the information recording apparatus of the present invention will be discussed later.

Next, with reference to FIG. 3, the data structure of the two-layer type optical disc associated with the information recording medium targeted for the recording by the first embodiment of the information recording apparatus of the present invention, the physical sector number constituting an ECC block in the recording area of the optical disc, and a recording or reproducing method in the parallel opposite manner of the optical disc will be discussed. FIG. 3 is a schematic graph showing the data structure of the two-layer type optical disc associated with the information recording medium targeted for the recording by the first embodiment of the information recording apparatus of the present invention, the physical sector number constituting an ECC block in the recording area of the optical disc, and the recording or reproducing method in a parallel opposite manner of the optical disc. The vertical axis and the horizontal axis are the same as those in FIG. 2.

Figure 3:
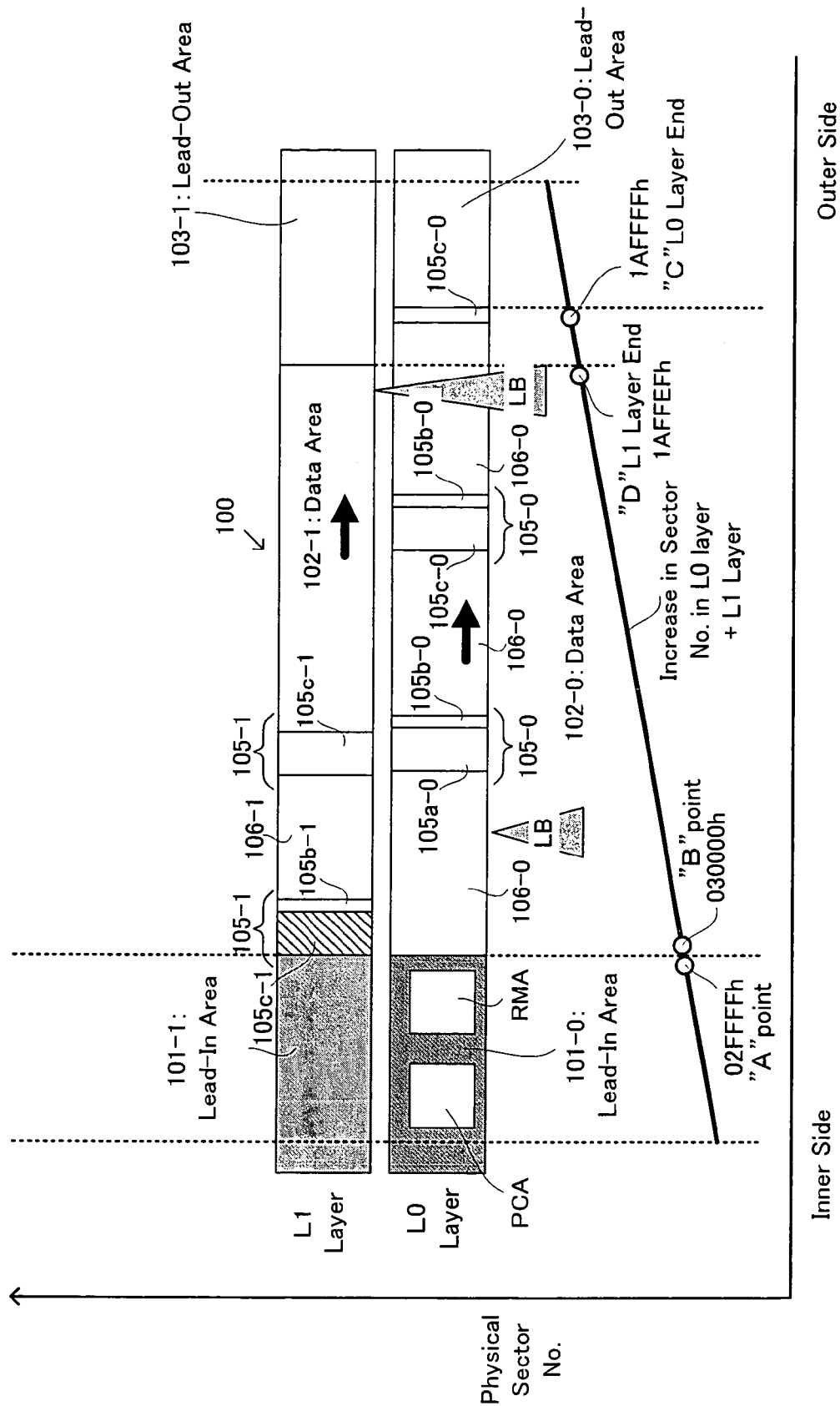
FIG. 3 is a schematic graph showing the data structure of a two-layer type optical disc associated with an information recording medium targeted for the recording by the first embodiment of the information recording apparatus of the present invention, the physical sector number constituting an ECC block in the recording area of the optical disc, and a recording or reproducing method in a parallel opposite manner of the optical disc.

As shown in FIG. 3, the two-layer type optical disc 100 targeted for the recording by the first embodiment of the information recording apparatus of the present invention is provided with: a not-illustrate substrate; and the two recording layers laminated on the substrate, i.e. the L0 layer and the L1 layer.

Specifically, the L0 layer is provided with: a lead-in area 101-0; a data area 102-0; and a lead-out area 103-0, from the inner to the outer circumferential side. In the lead-in area 101-0 or the inner portion thereof, there are provided the PC area PCA for the OPC process, the RM area RMA in which the recording management information is recorded, described above, and the like. In particular, the structure of the border zone and the like in the data area 102-0 is the same as in the explanation of FIG. 2 described above.

On the other hand, the L1 layer is provided with: a lead-in area 101-1; a data area 102-1; and a lead-out area 103-1, from the inner to the outer circumferential side. A not-illustrated OPC area or the like may be located even in the lead-out area 101-1. In particular, the data area 102-1 is also provided with: a border zone 105-1; and a border-out 105c-1, from the inner circumferential side, for example, and is provided with one border 106-1 between them in FIG. 3. The structure of each border zone 105-1 is the same as the above-mentioned border zone 105-0.

Since the two-layer type optical disc is constructed in the above manner, the focal distance and the like area controlled in the same manner as in the opposite manner, in recording or reproduction of the optical disc 100.

In particular, the parallel manner is adopted as the recording or reproducing procedure of the two-layer type optical disc associated with the information recording medium targeted for the recording by the first embodiment of the information recording apparatus of the present invention. In the parallel manner, if the recording or reproduction is ended in the L0 layer, the optical pickup, located on the most outer circumference, needs to be displaced again to the most inner circumference when the recording or reproduction is started in the L1 layer. Thus, it takes a changing time form the L0 layer to the L1 layer by that much.

Specifically, at first, in the L0 layer, as the optical pickup is displaced in the lead-in area 101-0, the data area 102-0, and the middle area 104-0, from the inner to the outer circumferential side, the sector number in the recording area of the optical disc 100 increases. More specifically, the optical pickup sequentially accesses the end position of the lead-in area 101-0 with a sector number of "02FFFFh" (refer to an A point in FIG. 3), the start position of the data area 102-0 with a sector number of "030000h" (refer to a B point in FIG. 3), and the end position of the data area 102-0 with a sector number of "1AFFFFh" (refer to a C point in FIG. 3), and the optical pickup is displaced to the middle area 104-0 which functions as the buffer, by which the recording or reproduction is performed in the L0 layer.

On the other hand, in the L1 layer, specifically, as the optical pickup is displaced in the lead-in area 101-1, the data area 102-1, and the lead-out area 103-1 from the inner to the outer circumferential side, the sector number in the recording area of the optical disc 100 increases. More specifically, the optical pickup sequentially accesses the lead-in area 101-1 which functions as the buffer, the start position of the data area 102-1 with a sector number of "030000h" (refer to the B point in FIG. 3), and the end position of the data area 102-1 with a sector number of "1AFFEFh" (refer to a D point in FIG. 3), and the optical pickup is displaced to the lead-out area 103-1, by which the recording or reproduction is performed in the L1 layer.

Thus, the content information is recorded or reproduced at the same time that the optical pickup is continuously displaced, in the sector numbers of "030000h" to "1AFFFFh" of the data area 102-0 in the L0 layer and the sector numbers of "030000h" to "1AFFFFh" of the data area 102-1 in the L1 layer, for example.

With respect to the physical sector number explained above, a Logical Block Address (LBA) is assigned, one to one. More specifically, for example, a "000000h" LBA corresponds to the sector number of "030000h", and a "17FFEFh" LBA corresponds to the sector number of "1AFFFFh" in the L0 layer. On the other hand, a "180000h" LBA corresponds to the sector number of "030000h", and a "2FFFEFh" LBA corresponds to the sector number of "1AFFFFh" in the L1 layer.

Next, with reference to FIG. 4, the physical recording capacity of a normal border zone of the two-layer type optical disc, such as a DVD-R, targeted for the recording by the information recording/reproducing apparatus in the first embodiment of the information recording apparatus of the present invention will be discussed. FIG. 4 is a table showing the physical recording capacity of the normal border zone in the L0 layer of the two-layer type optical disc, such as a DVD-R, targeted for the recording by the information recording/reproducing apparatus in the first embodiment.

As shown in FIG. 4, the columns in the horizontal direction show the sector numbers which indicate the start positions of the border zones corresponding to the inner, the middle, and outer circumference, in this order from the left. The rows in the horizontal direction show the recording capacity of the border zone recorded for the first time and the recording capacity of the border zone recorded for the second or more time, with the number of ECC blocks and the number of bytes. The recording capacity of the normal border zone varies depending on the start position to be recorded. If recorded for the first time, a border zone relatively long in the radial direction is recorded. On the other hand, if recorded for the second or more time, a border zone relatively short in the radial direction is recorded.

Specifically, it is defined such that the length in the radial direction of the border zone recorded for the first time is about 0.5 mm, and that the length in the radial direction of the border zone recorded for the second or more time is about 0.1 mm. More specifically, as shown on the table in FIG. 4, in the normal border close process after a sector number of "165700h" in the recording area of the optical disc, the recording capacity of the border zone recorded for the first time is "2944" ECC blocks and "92" MB. On the other hand, the recording capacity of the border zone recorded for the second or more time is "608" ECC blocks and "19" MB. Discussing this in detail, the reason why the border zone recorded for the first time is made 0.5 mm long is to recognize the first border, formed by the border zone recorded for the first time, even by using a DVD-ROM reproduce-only drive (hereinafter referred to as a "multi border non-supporting drive", as occasion demands) which is produced in the beginning and which cannot recognize the multi border structure of the optical disc, for example. More specifically, the multi border non-supporting drive is basically designed to recognize the lead-out area which is defined to have a minimum value of about 0.5 mm in length in the radial direction. By this, even the multi border non-supporting derive can reproduce information in the data area which is from the lead-in area to the border zone recorded for the first time, as in the normal DVD-ROM. As described above, mixing 0.5 mm and 0.1 mm is advantageous in the point that a time length for the border close process can be reduced, as compared to the case where the border zone is all defined to have 0.5 mm in length.

Figure 5:
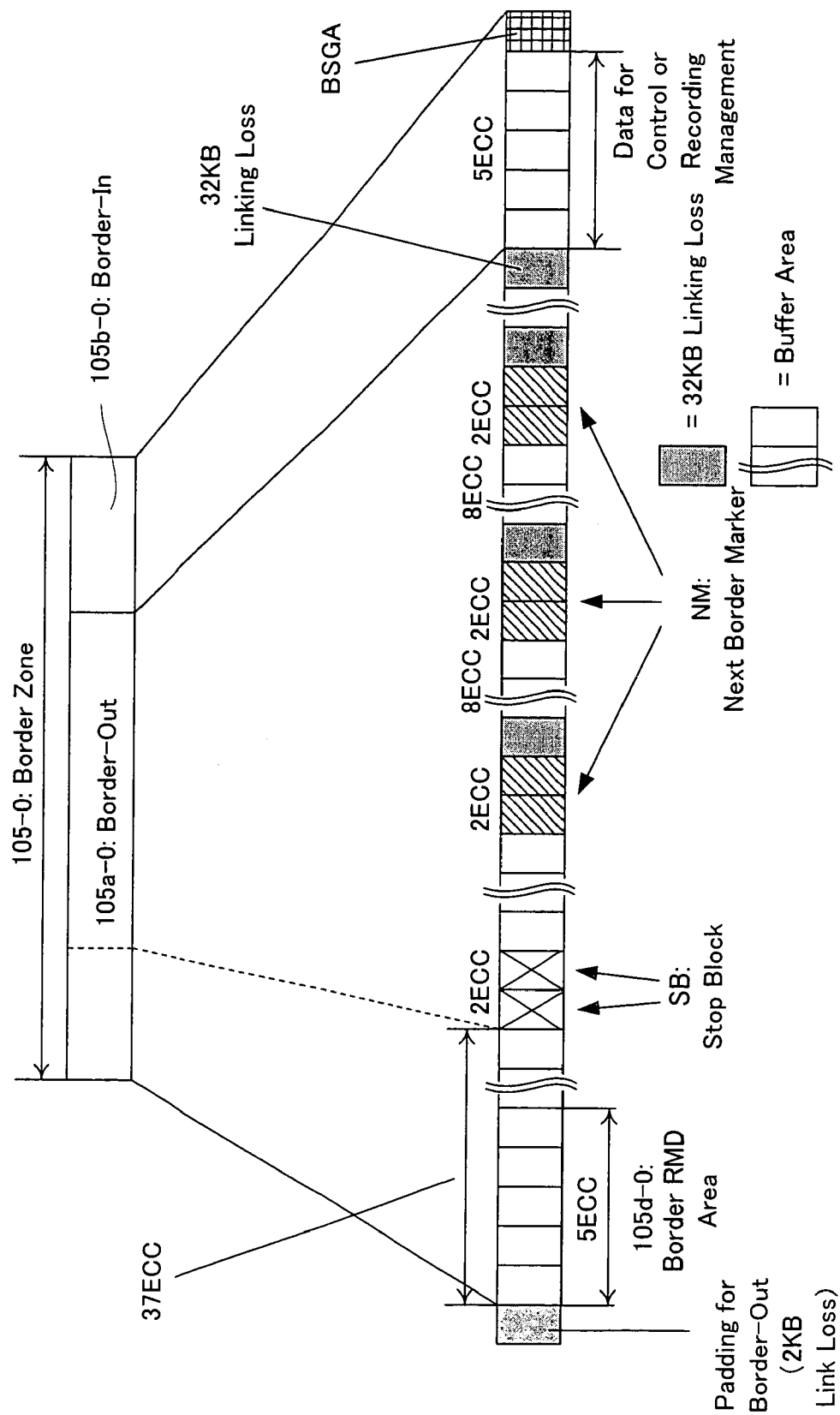
FIG. 5 is a data structural view showing the detailed data structure of the normal border zone in the L0 layer of the two-layer type optical disc, such as a DVD-R, targeted for the recording by the information recording/reproducing apparatus in the first embodiment of the information recording apparatus of the present invention.

Next, with reference to FIG. 5, the detailed data structure of the normal border zone in the L0 layer of the two-layer type optical disc, such as a DVD-R, targeted for the recording by the information recording/reproducing apparatus in the first embodiment of the information recording apparatus of the present invention will be discussed. FIG. 5 is a data structural view showing the detailed data structure of the normal border zone in the L0 layer of the two-layer type optical disc, such as a DVD-R, targeted for the recording by the information recording/reproducing apparatus in the first embodiment.

As shown in FIG. 5, the normal border zone 105-0 (105-1: hereinafter, a numerical reference in round brackets indicates the one in the L1 layer) is provided with: the border-out 105a-0 (105a-1); and the border-in 105b-0 (105b-1). The recording capacity of the normal border zone is, for example, "2944" ECC blocks (for 0.5 mm described above) or "608"ECC blocks (for 0.1 mm described above).

In the border-in 105b-0 (105b-1), data for control or recording management which is the newest "5" ECC blocks is recorded. The structure of the data for control or recording management is the same as that of the data for control or recording management recorded in the lead-in area. Incidentally, a BSGA (Block SYNC Guard Area) disposed in the last position of the border-in 105b-0 (105b-1) is recorded in order to guarantee that if the data for control or recording management in the border-in is unrecorded, already recorded ECC block which locates next to the border-in 105b-0 (105b-1) can be reproduced.

The border-out 105a-0 (105a-1) or 105c-0 (105c-1) is further provided with: a border RMD area 105d-0; a stop block SB; three next border markers NM; and a buffer area including buffer data.

In the border RMD area 105d-0, there are copied and recorded five data for recording management, such as the newest RMD (Recording Management Data). The border RMD area 105d-0 can provide management information or the like for reproducing the information recorded in the border, for the DVD-ROM reproduce-only drive which cannot read the RM area in the lead-in area of a DVD-R or on the inner circumferential side thereof, for example.

The stop block SB has a recording capacity of "2" ECC blocks and is relatively located on the 38th and 39th from the start position of the border-out 105a-0 (105a-1) or 105c-0 (105c-1). The attribute of the stop block SB area is the same as that of the lead-out area. This is to allow the optical pickup to recognize the same area as the lead-out area and to prevent the runaway of the optical pickup.

Each of the next border markers NM has a recording capacity of "2" ECC blocks. By virtue of the next border marker NM, it is possible to judge whether or not there is a next border. Specifically, if there is no next border and the lead-out area has not been recorded yet, the next border marker NM of the border-out located in the last position is unrecorded.

Moreover, in the border close process, for example, "00h" is recorded in each next border marker NM of the border-out located in the second last position. Furthermore, in a finalize process, for example, "00h" is padded in each next border marker NM of the last border-out, and the attribute of each next border maker NM is made the same as that of the lead-out area.

Incidentally, in the case of a DVD-RW, there is no next border marker NM.

Figure 6:
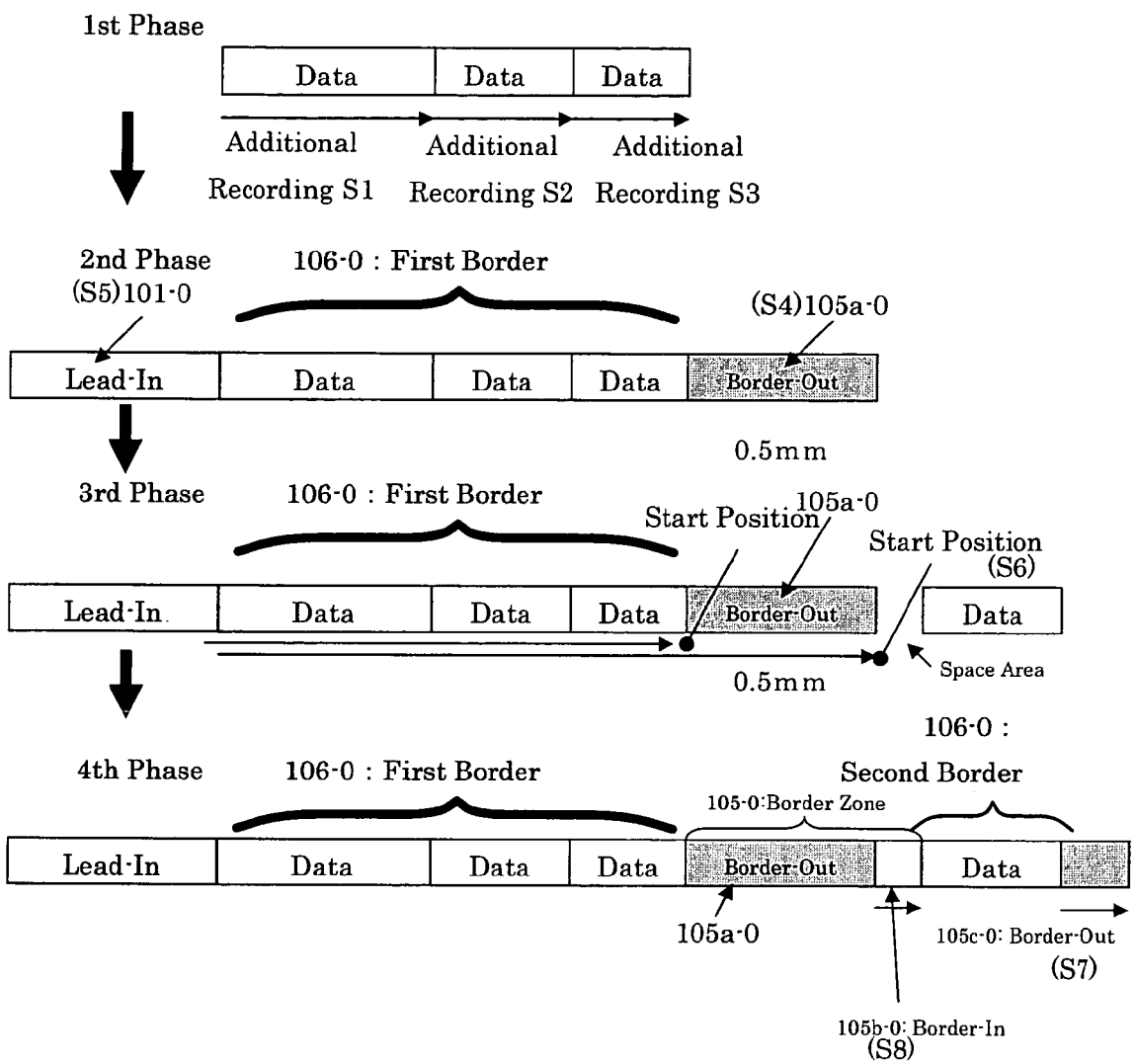
FIG. 6 is a conceptual view schematically showing, with four phases, the procedure of a border close process in the recording area of the optical disc, by the information recording/reproducing apparatus in the first embodiment of the information recording apparatus of the present invention.

Next, with reference to FIG. 6, the procedure of the general border close process in the recording area of the optical disc, by the information recording/reproducing apparatus in the first embodiment of the information recording apparatus of the present invention will be discussed. FIG. 6 is a conceptual view schematically showing, with four phases, the procedure of the border close process in the recording area of the optical disc, by the information recording/reproducing apparatus in the first embodiment. Incidentally, in order to facilitate understanding, FIG. 6 shows the border close process in the L0 layer in the case where the border zone is not bridged or not recorded over the layers.

At first, as shown in a first phase in FIG. 6, information, such as data, is additionally recorded or written once by a DVD-R recording drive, for example, from the left to the right (from the inner to the outer circumferential side, in the case of the L0 layer), for each sector. This type of recording method is referred to as a sequential recording method (refer to a step S1, step S2, and step S3 in FIG. 6).

Next, as shown in a second phase in FIG. 6, the border close process is performed in order to allow the information on the optical disc to be read by a ROM reproduce-only drive. Specifically, after the recording of the border-out 105*a*-0 (step S4), the management information or the like is recorded into the lead-in area 101-0 (step S5). More specifically, in addition to the physical sector number or the like which indicates the position information about a position at which the border-out 105*a*-0 starts, the position information about a position at which the next border-in 105*b*-0 starts is recorded in the lead-in area 101-0. Incidentally, since it is the first border close process, the border-out 105*a*-0 with a length of 0.5 mm in the radial direction is recorded (refer to the explanation for FIG. 4, described above).

Consequently, the first border (bordered area) 106-0 on the optical disc in the second phase can be read by all the DVD-ROM reproduce-only drives, including the multi border non-supporting drive, for example.

Next, as shown in a third phase in FIG. 6, information, such as data, is additionally recorded or written once by the DVD-R recording drive, in a step S6, for each sector. Specifically, in this step, a space is made for an area into which the border-in area 105*b*-0 is recorded in a next forth phase, and additional or postscript recording is performed.

Consequently, on the optical disc in the third phase, only the information, such as data, in the first border 106-0 in which the first border close process is completed can be recognized by the DVD-ROM reproduce-only drive.

Next, as shown in the fourth phase in FIG. 6, the second border close process is performed in order to allow the information additionally recorded or written once in the step S6 in the third phase, to be read by the DVD-ROM reproduce-only drive. Incidentally, since it is the border close process which is performed for the second or more time, the border-out 105*c*-0 with a length of 0.1 mm in the radial direction is recorded (step S7). At he same time, the border-in 105*b*-0 is recorded in a space area in the third phase (step S8).

Consequently, on the optical disc in the fourth phase, the information, such as data, in the areas of the first border 106-0 and the second border 106-0 can be read by the DVD-ROM reproduce-only drive which can recognize the multi border structure of the optical disc (hereinafter referred to as a "multi border supporting drive", as occasion demands).

Figure 7:
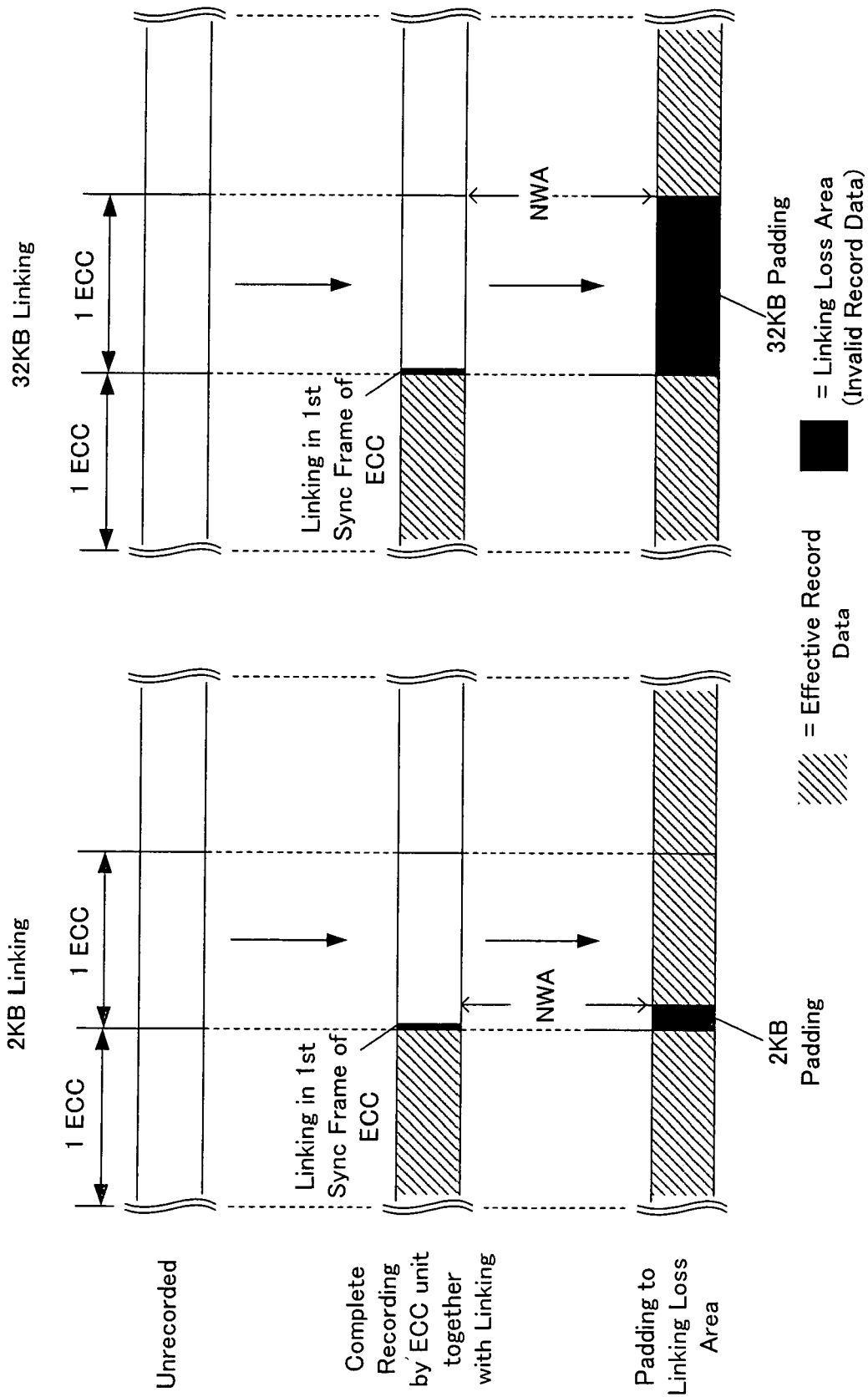
FIG. 7 is a conceptual view showing a procedure in two types of linking in a general additional recording in the recording area of the optical disc by the information recording/reproducing apparatus in the first embodiment of the information recording apparatus of the present invention.

Next, with reference to FIG. 7, two types of linking in a general additional recording in the recording area of the optical disc, such as a DVD-R, by the information recording/reproducing apparatus in the first embodiment of the information recording apparatus of the present invention will be discussed. FIG. 7 is a conceptual view showing a procedure in the two types of linking in the general additional recording in the recording area of the optical disc by the information recording/reproducing apparatus in the first embodiment.

As shown in FIG. 7, for example, in the linking of the DVD-R, two type of linking sizes, 2 KB and 32 KB, are defined. In the case of the linking size of 2 KB, for example, if the recording is completed by one ECC unit, the recording is ended in a first sync frame of a next unrecorded ECC block (refer to the middle part on the left side of FIG. 7).

Then, in restarting the recording, the recording is restarted from the first sync frame. After a 2 KB linking loss area is generated, the additional recording of user data is continuously started from a NWA (Next Writable Address) which indicates a next writing point (refer to the lower part on the left side of FIG. 7). As described above, in the case of the linking size of 2 KB, it is possible to reduce overhead more; however, the quality of error correction in the ECC block where the linking occurs is deteriorated. On the other hand, in the case of the linking size of 32 KB, for example, if the recording is completed by one ECC unit, the recording is ended in the first sync frame of a next unrecorded ECC block, as in the case of 2 KB (refer to the middle part on the right side of FIG. 7).

Then, in restarting the recording, the recording is restarted from the first sync frame. After a 32 KB linking loss area is generated, the additional recording of the user data is started from the NWA, i.e., from the head of the next ECC block (refer to the lower part on the right side of FIG. 7). As described above, in the case of the linking size of 32 KB, the overhead increases more; however, the quality of error correction in the ECC block where the linking occurs remains high because it is not influenced by the linking.

Figure 8:
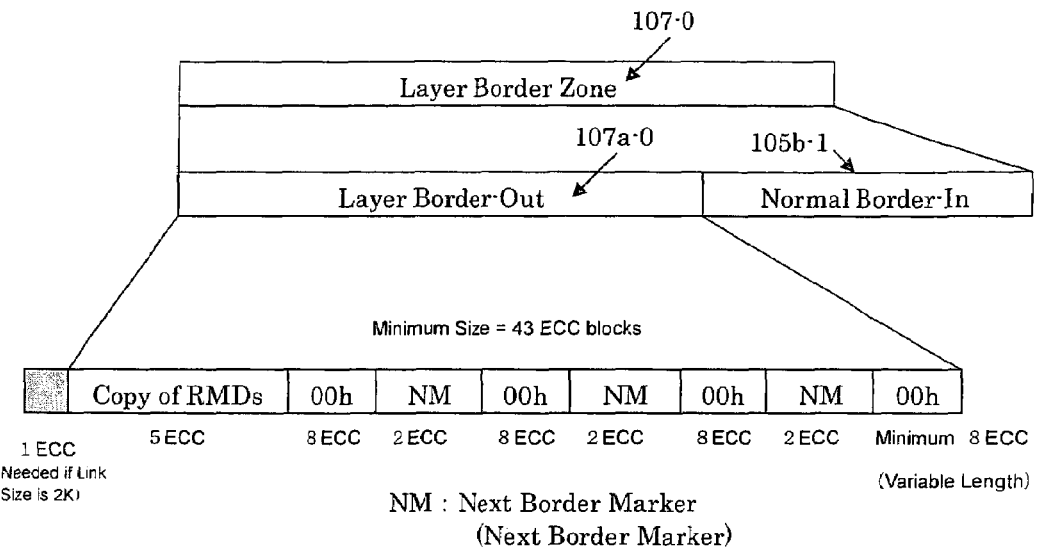
FIG. 8 is a schematic data structural view showing one specific example of the detailed data structure of a layer border zone of the two-layer type optical disc targeted for the recording by the information recording/reproducing apparatus in the first embodiment of the information recording apparatus of the present invention.

Next, with reference to FIG. 8, an explanation will be given to one specific example of the detailed data structure of a so-called layer border zone, which is one specific example of an area in which the "second border-information" of the present invention is recorded, on the two-layer type optical disc targeted for the recording by the information recording/reproducing apparatus in the first embodiment of the information recording apparatus of the present invention. The layer border zone herein is a border zone in which the information is bridged and recorded over the two layers in the border close process. FIG. 8 is a schematic data structural view showing one specific example of the detailed data structure of the layer border zone of the two-layer type optical disc targeted for the recording by the information recording/reproducing apparatus in the first embodiment.

As shown in FIG. 8, on the two-layer type optical disc targeted for the recording by the information recording/reproducing apparatus in the first embodiment, the recording capacity of the layer border zone is less than that of the normal border zone, explained in FIG. 5 described above, since it is bridged and recorded over the two recording layers in the border close process. Specifically, a layer border zone 107-0 is provided with: a layer border-out 107*a*-0; and the above-mentioned border-in 105*b*-1. The layer border-out 107*a*-0 is provided with: the above-mentioned border RMD area 105*c*-

0; and the three next border markers NM. Between the two of these areas, dummy data, such as "00h", is padded with a recording capacity of "8" ECC blocks.

In particular, the recording capacity of the dummy data, which is padded in the last position of the layer border-out 107a-0, is variable in length, with a minimum recording capacity of "8" ECC blocks. Thus, it is possible to vary the recording capacity of the layer border-out from a minimum value of "43" ECC blocks to a maximum value of "2937" ECC blocks, which is the recording capacity of the normal border-out, for example.

First Embodiment of Information Recording Apparatus

Figure 9:
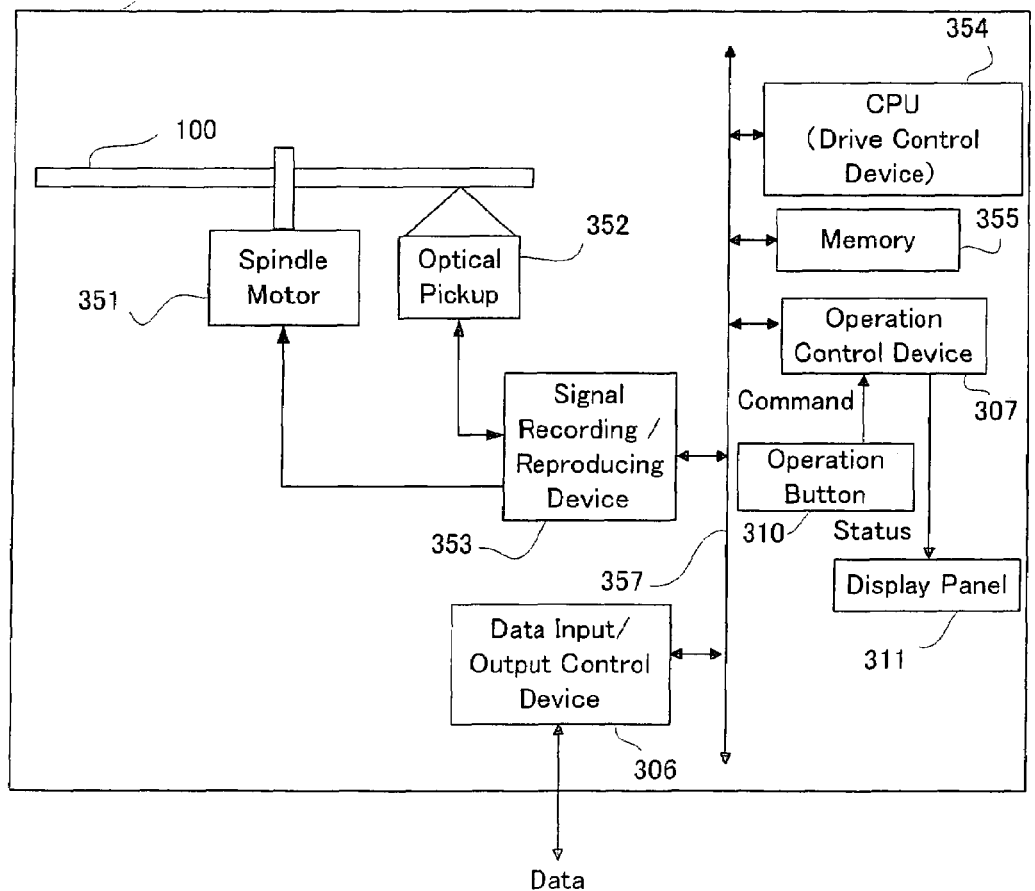
FIG. 9 is a block diagram showing the information recording/reproducing apparatus in the first embodiment of the information recording apparatus of the present invention.

Next, with reference to FIG. 9, the structure and operation of the information recording/reproducing apparatus in the first embodiment of the information recording apparatus of the present invention will be discussed in detail. In particular, the first embodiment is an example in which the information recording apparatus of the present invention is applied to an information recording/reproducing apparatus for the optical disc. FIG. 9 is a block diagram showing the information recording/reproducing apparatus in the first embodiment of the information recording apparatus of the present invention. Incidentally, an information recording/reproducing apparatus 300 has a function of recording the record data onto the optical disc 100 and a function of reproducing the record data recorded on the optical disc 100.

In FIG. 9, the information recording/reproducing apparatus 300 is provided with: the optical disc 100; a spindle motor 351; an optical pickup 352; a signal recording/reproducing device 353; a CPU (drive control device) 354; a memory 355; a data input/output control device 306; an operation control device 307; an operation button 310; a display panel 311; and a bus 357.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is to perform the recording/reproduction with respect to the optical disc 100, and is provided with a semiconductor laser device, a lens, and the like. More specifically, the optical pickup 352 irradiates the optical disc 100 with a light beam, such as a laser beam, as reading light with a first power upon reproduction, and as writing light with a second power upon recording, with it modulated. In particular, the optical pickup 352 constitutes one specific example of the "writing device" of the present invention.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352, in order to determine an optimum laser power by the recording and reproduction processes for the OPC pattern, together with a not-illustrated timing generator or the like, under the CPU 354, upon the OPC process.

The memory 355 is used in the whole data processing and the OPC process or the like on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device is stored; a buffer used for compression/decompression of video data; a RAM area into which a parameter required for the operation of a program or the like is stored; and the like.

The CPU (drive control device) 354 is connected to the signal recording/reproducing device 353 and the memory 355 through the bus 357, and controls the entire information recording/reproducing apparatus 300 by giving an instruction to each controlling device. In general, software for operating the CPU 354 is stored in the memory 355. In particular, the CPU 354 is one specific example of the "controlling device" and the "judging device" of the present invention.

The data input/output control device 306 controls the input/output of the data from the exterior with respect to the information recording/reproducing apparatus 300, to thereby perform storage to and export from the data buffer on the memory 355. If the input/output of the data is a video signal, the data input/output control device 306 compresses (encodes) the data received from the exterior in a MPEG format, for example, and outputs it to the memory 355, upon data inputting. Upon data outputting, it decompresses (decodes) the encoded data in the MPEG format or the like received from the memory 355, and outputs it to the exterior.

The operation control device 307 receives an operation instruction and performs display with respect to the information recording/reproducing apparatus 300, and transmits an instruction by the operation button 310, such as an instruction to record or reproduce, to the CPU 354, and outputs the operation state of the information recording/reproducing apparatus 300, such as during recording and during reproduction, to the display panel 311, such as a fluorescent tube. In particular, in the embodiment, the operation control device 307 may be provided with a not-illustrated CPU and memory or the like, as a host computer.

One specific example of the information recording/reproducing apparatus 300, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 355, on the CPU 354.

Flow of Recording Operation by Information Recording/Reproducing Apparatus—First Embodiment—

Figure 10:
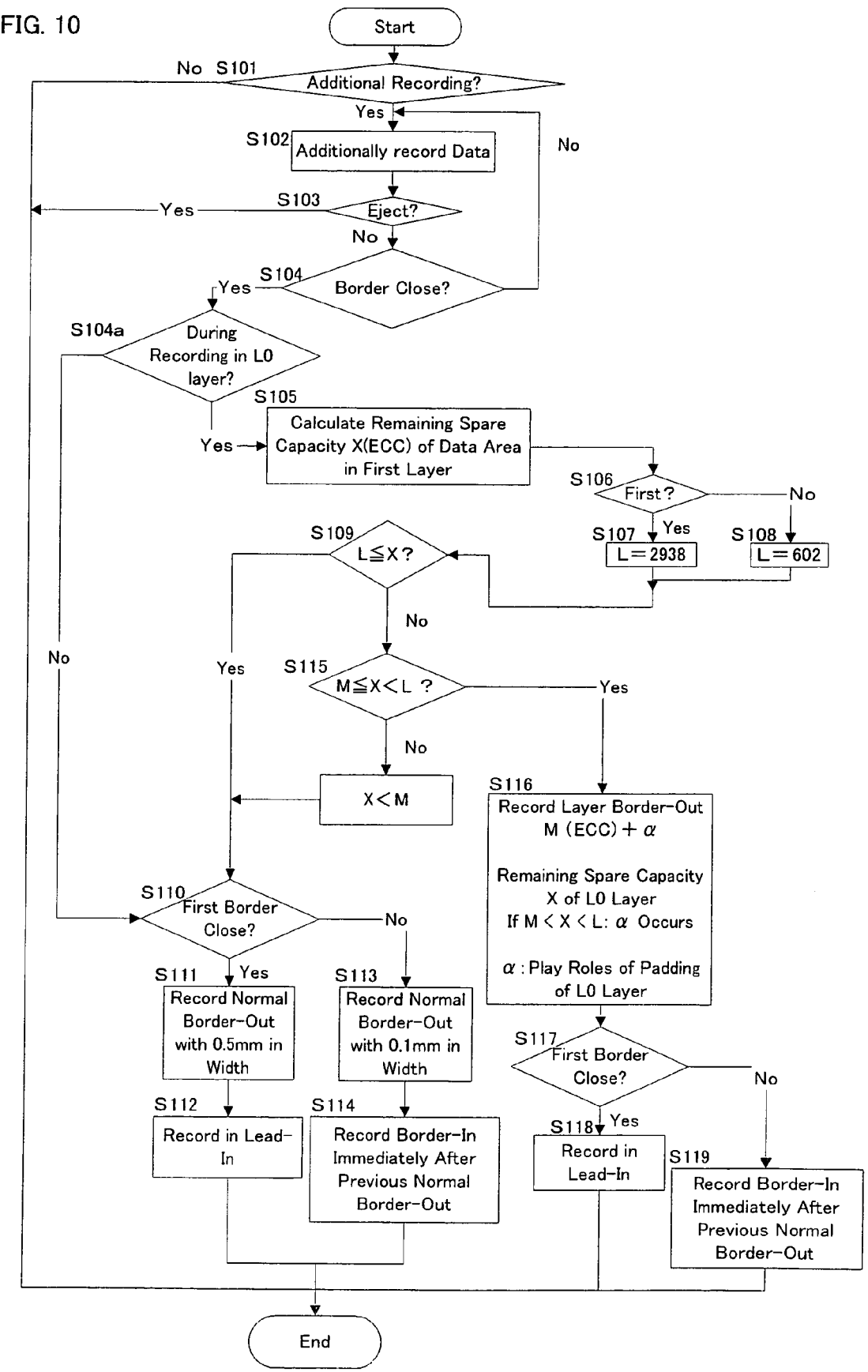
FIG. 10 is a flowchart showing a flow of the recording operation of the optical disc on the information recording/reproducing apparatus in the first embodiment of the information recording apparatus of the present invention.
Figure 11:
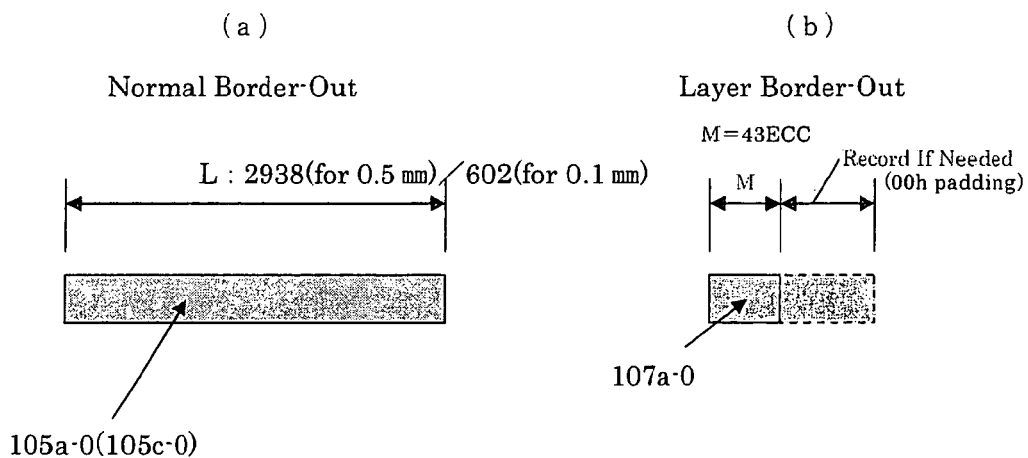
FIG. 11(a) is a conceptual view showing a normal border-out area in which recording is performed by the information recording/reproducing apparatus in the first embodiment of the information recording apparatus of the present invention.
FIG. 11(b) is a conceptual view showing a layer border-out area.
Figure 12:
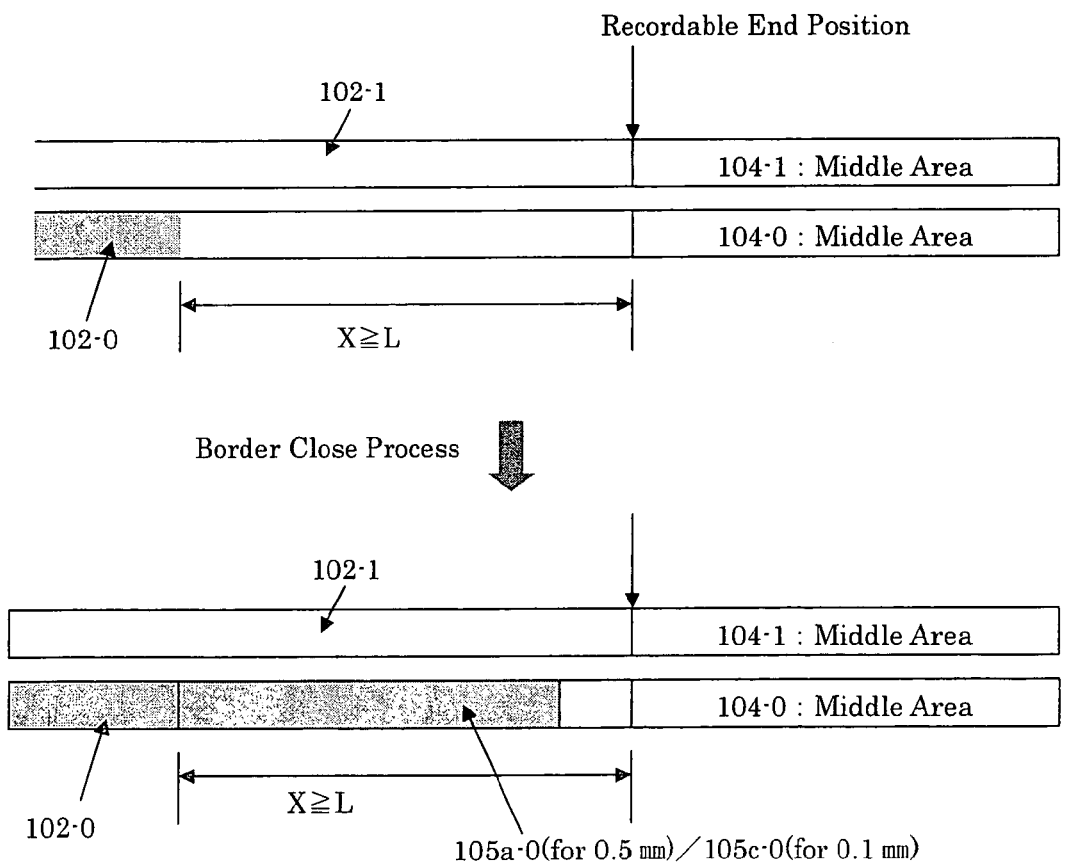
FIG. 12 is a conceptual view schematically showing the recording areas of the L0 layer and an L1 layer if the spare capacity "X" of a data area of the L0 layer is equal to or greater than "L", which corresponds to steps S110 to S114 in FIG. 10.
Figure 13:
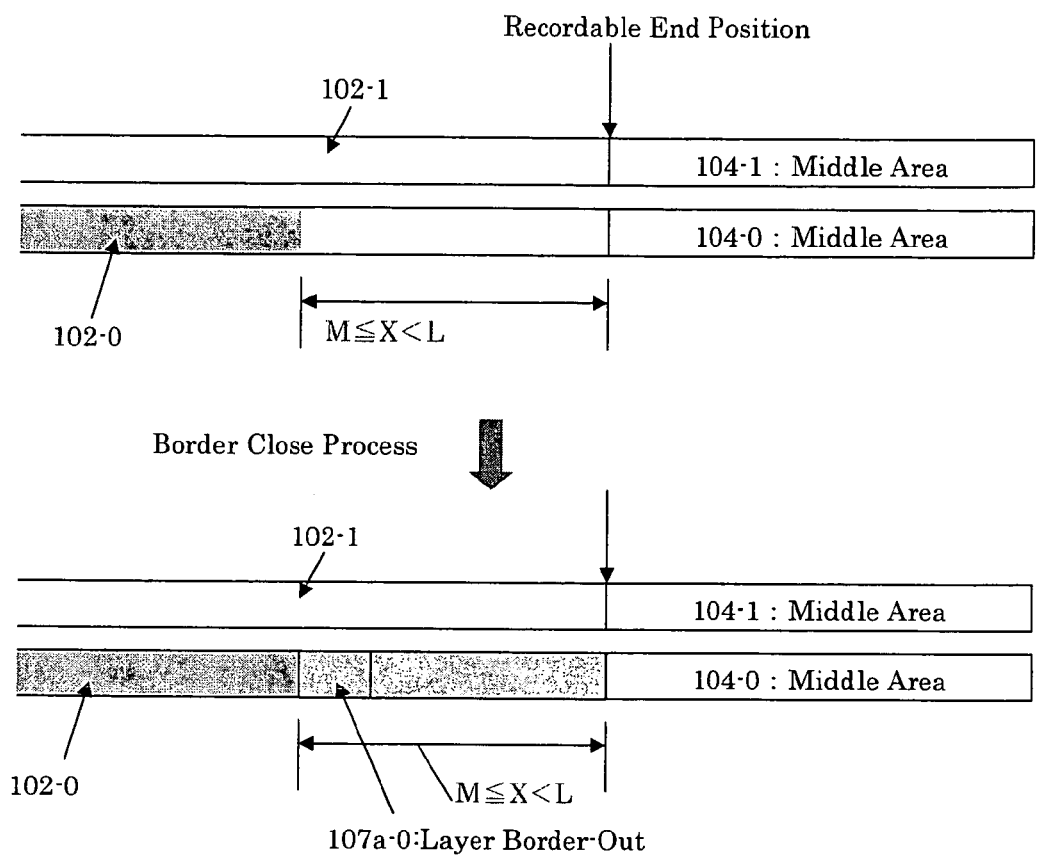
FIG. 13 is a conceptual view schematically showing the recording areas of the L0 layer and the L1 layer if the spare capacity "X" of the data area of the L0 layer is equal to or greater than "M" and less than "L", which corresponds to steps S116 to S119 in FIG. 10.
Figure 14:
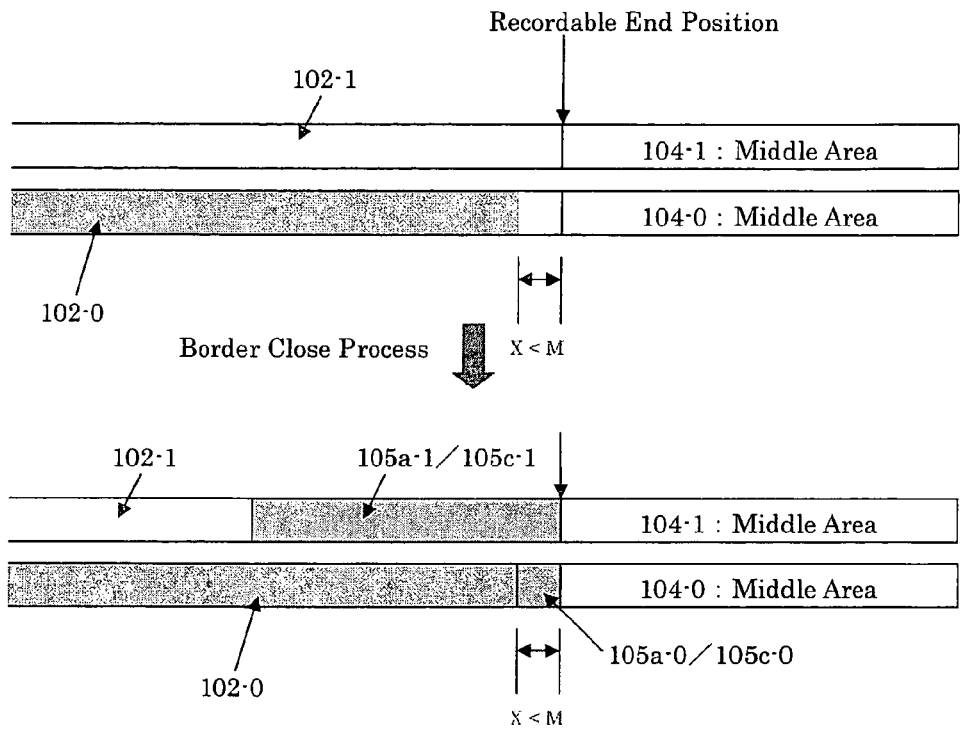
FIG. 14 is a conceptual view schematically showing the recording areas of the L0 layer and the L1 layer when the normal border close process is performed over the layers if the spare capacity "X" of the data area of the L0 layer is less than "M", which corresponds to the steps S110 to S114 in FIG. 10.
Figure 15:
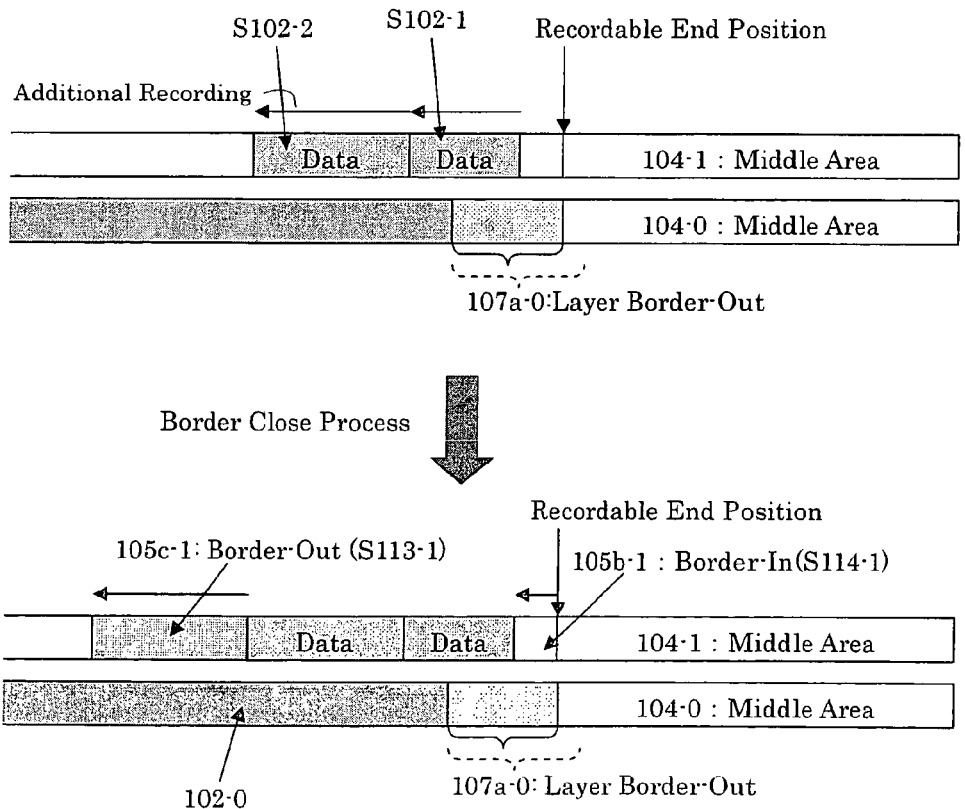
FIG. 15 is a conceptual view schematically showing the recording areas of the L0 layer and the L1 layer if additional recording and the border close process are performed in the L1 layer on the basis of the step S104a in FIG. 10.

Next, with reference to FIG. 10 to FIG. 15, a flow of the recording operation of the optical disc on the information recording/reproducing apparatus in the first embodiment of the information recording apparatus of the present invention will be discussed in detail. FIG. 10 is a flowchart showing the flow of the recording operation of the optical disc on the information recording/reproducing apparatus in the first embodiment of the information recording apparatus of the present invention. Incidentally, in FIG. 10, "X" and "α" are both variables, and "L" and "M" are both constants. FIG. 11(a) is a conceptual view showing a normal border-out area in which recording is performed by the information recording/reproducing apparatus in the first embodiment of the information recording apparatus of the present invention, and FIG. 11(b) is a conceptual view showing a layer border-out area. Incidentally, "L" constitutes one example of the "first threshold value" of the present invention, and specifically, it is "2938 (for 0.5 mm)" or "602 (for 0.1 mm)" ECC blocks, as described above. Moreover, "M" constitutes one example of the "second threshold value" of the present invention, and specifically, it is "43"ECC blocks, as described above. FIG. 12 is a conceptual view schematically showing the recording areas of the L0 layer and the L1 layer if the spare capacity "X" of the data area of the L0 layer is equal to or greater than "L", which corresponds to steps S110 to S114 in FIG. 10. Incidentally, in FIG. 12, the right side indicates the outer circumferential side, and the left side indicates the inner circumferential side. FIG. 13 is a conceptual view schematically showing the recording areas of the L0 layer and the L1 layer if the spare capacity "X" of the data area of the L0 layer is equal to or greater than "M" and less than "L", which corresponds to steps S116 to S119 in FIG. 10. Incidentally, the position relationship of the inner and outer circumferential sides is the same as in FIG. 12. FIG. 14 is a conceptual view schematically showing the recording areas of the L0 layer and the L1 layer when the normal border close process is performed over the layers if the spare capacity "X" of the data area of the L0 layer is less than "M", which corresponds to the steps S110 to S114 in FIG. 10. Incidentally, the position relationship of the inner and outer circumferential sides is the same as in FIG. 12. FIG. 15 is a conceptual view schematically showing the recording areas of the L0 layer and the L1 layer if additional recording and the border close process are performed in the L1 layer on the basis of the step S104a in FIG. 10. Incidentally, the position relationship of the inner and outer circumferential sides is the same as in FIG. 12.

At first, in FIG. 10, if the optical disc 100 is loaded, a seek operation is performed by the optical pickup 352 under the control of the CPU 354, to thereby obtain various management information necessary for a recording process with respect to the optical disc 100. At the same time, it is judged whether or not the user data or the like is additionally recorded or written once, for example (step S101). If the additional recording is performed onto the optical disc 100 (the step S101: Yes), the additional recording by the information recording/reproducing apparatus is performed by a unit of sector or ECC block, in the L0 layer, for example (step S102). Then, it is judged whether or not the optical disc is ejected (step S103). If the optical disc is not ejected (the step S103: No), it is further judged whether or not the border close process is performed (step S104). If the border close process is performed (the step S104: Yes), it is further judged whether or not the additional recording by the information recording/reproducing apparatus is performed in the L0 layer (step S104a). If the additional recording by the information recording/reproducing apparatus is performed in the L0 layer (the step S104a: Yes), a remaining spare capacity "X" (ECC block) of the data area in the L0 layer is calculated (step S105). In this case, a spare capacity which does not satisfy one ECC block is cut off and then calculated.

On the other hand, as a result of the judgment in the step S104, if the border close process is not performed (the step S104: No), the additional recording in the L0 layer is performed (the step S102).

Then, it is judged whether or not it is the first border close process for the optical disc (step S106). If it is the first border close process for the optical disc (the step S106: Yes), for example, "2938" (ECC blocks) is substituted into the constant "L" (step S107). More specifically, this allows the length of the border zone to be about 0.5 mm in the radial direction of the border zone recorded for the first time on the recording surface of the optical disc.

On the other hand, if it is not the first border close process for the optical disc (the step S106: No), for example, "602" (ECC blocks) is substituted into the constant "L" (step S108). More specifically, this allows a length of about 0.1 mm in the radial direction of the border zone which is the second or more position on the recording surface of the optical disc. Then, it is judged whether or not the spare capacity "X" is equal to or greater than the constant "L" (step S109). If the spare capacity "X" is equal to or greater than the constant "L" (the step S109: Yes), it is further judged whether or not it is the first border close process for the optical disc (step S110). If it is the first border close process for the optical disc (the step S110: Yes), the normal border-out 105a-0 is recorded (step S11l). More specifically, as shown in FIG. 12, the spare capacity "X" of the L0 layer is equal to or greater than the constant "L", so that the normal border-out 105a-0 with a length of 0.5 mm in the radial direction (wherein L="2938" ECC blocks: refer to FIG. 11(a)) is recorded in the L0 layer. Then, the management information or the like is recorded into the lead-in area 101-0 (step S112). More specifically, in addition to the physical sector number or the like which indicates the position information about a position at which the border-out 105a-0 starts, the position information about a position at which the next border-in 105b-0 starts is recorded in the lead-in area 101-0.

On the other hand, if it is not the first border close process (the step S110: No), the normal border-out 105c-0 is recorded (step S113). More specifically, as shown in FIG. 12, since the spare capacity "X" of the L0 layer is equal to or greater than the constant "L", the normal border-out 105c-0 with a length of 0.1 mm in the radial direction (wherein L="602" ECC blocks: refer to FIG. 11(a)) is recorded into the L0 layer.

Then, the border-in 105b-0 is recorded immediately after the previously recorded, normal border-out 105a-0 or 105c-0 (step S114).

On the other hand, as a result of the judgment in the step S109, if the spare capacity "X" is less than the constant "L" (the step S109: No), it is further judged whether or not the spare capacity "X" is equal to or greater than the constant "M" (step S115). If the spare capacity "X" is not equal to or not greater than the constant "M" (the step S115: No), the spare capacity "X" is less than the constant "M", so that the normal border close process in the step S110 to the step S114 is performed. However, in the step S111 and the step S113, more specifically, as shown in FIG. 14, the spare capacity "X" is less than the constant "M", so that the normal border-out (refer to FIG. 11(a): L="2938" or "602" ECC blocks) is bridged and recorded over the L0 layer and the L1 layer.

On the other hand, as a result of the judgment in the step S115, if the spare capacity "X" is equal to or greater than the constant "M" (the step S115: Yes), the layer border-out is recorded in the data area of the L0 layer (step S116). Specifically, as shown in FIG. 13, the spare capacity "X" of the L0 layer is equal to or greater than the constant "M" (e.g. "M"="43") and less than the constant "L", so that the layer border-out (refer to FIG. 11(b)) is expanded and recorded in the data area of the L0 layer. More specifically, as for the "M" ECC blocks, they are recorded into the data area, and as for the capacity of "X-M" ECC blocks, dummy data "α", such as "0" and "Null", is padded and recorded until the start position of the middle area.

Then, it is judged whether or not it is the first border close process for the optical disc (step S117). If it is the first border close process for the optical disc (the step S117: Yes), the management information or the like is recorded into the lead-in area.

On the other hand, as a result of the judgment in the step S117, if it is not the first border close process for the optical disc (the step S117: No), the border-in is recorded immediately after the previously recorded, normal border-out (step S119).

On the other hand, as a result of the judgment in the step S104a, the case where the additional recording by the information recording/reproducing apparatus is not performed in the L0 layer, namely, where it is performed in the L1 layer (the step S104a: No) will be discussed. In this case, more specifically, as shown in a step S102-1 and a step S102-2 in FIG. 15, the additional recording of the information, such as data, is performed from the outer to the inner circumferential side in the L1 layer.

Then, as in the above-mentioned step S110, it is judged whether or not it is the first border close process for the optical disc. However, the border close process in the L1 layer may move to the step S113 unconditionally, with the judgment process in the step S110 omitted. More specifically, as shown in a step S113-1 in FIG. 15, the normal border-out 105c-1 with a length of 0.1 mm in the radial direction may be recorded into the L1 layer.

Then, as in the above-mentioned step S114, the border-in 105b-1 is recorded immediately after the previously recorded, normal border out (which is described in the step S114). More specifically, as shown in a step S114-1 in FIG. 15, the border-in 105b-0 is recorded into a space area in the L1 layer, located just above the layer border-out 107a-0 recorded into the L0 layer in the step S116, for example. However, if the first border close process is performed in the L1 layer without any border close process, even once, in the L0 layer, the border-in 105b-0 may be recorded into the lead-in area.

On the other hand, as a result of the judgment in the step S101, if the additional recording is not performed (the step S101: No), and as a result of the judgment in the step S103, if the optical disc is ejected (the step S103: Yes), a series of additional recording or border close process is ended.

Next, with reference to FIG. 2 and FIG. 3 described above, consideration is given to the operational effect of the information recording/reproducing apparatus in the first embodiment of the information recording apparatus of the present invention. As shown in FIG. 2, on the two-layer type optical disc, the logical block address (LBA) continues between LBA in the L0 layer and LBA in the L1 layer which almost looks like LBA in a one-layer type optical disc, as described above. Therefore, if the border-out 105a-1 or 105c-1 included in the border-zone 105-1 is bridged and recorded over the L0 layer and the L1 layer, it can be recorded into the L1 layer in the same recording condition or manner as in the L0 layer.

In this case, however, for example, in the opposite manner, the middle area is already located as the buffer area in the L1 layer, so that the border zone, which originally functions as the buffer area and which is provided with the border-out 105a-1 (or 105c-1) and the border-in 105b-1 is unnecessary in the L1 layer. More specifically, for example, if the border zone 105-0 (105-1) is bridged and recorded over the L0 layer (refer to the border-out 105c-0 in FIG. 2) and the L1 layer (refer to the border-out 105c-1 in FIG. 2), the border zone 105-1 is unnecessary because the middle area 104-1 already exists as the buffer area.

Even in the parallel manner, as shown in FIG. 3, if the border zone 105-1 is bridged and recorded over the L0 layer and the L1 layer, the border zone 105-1 which originally functions as the buffer area is unnecessary in the L1 layer because the lead-in area 101-1 already exists in the L1 layer as the buffer area. More specifically, for example, if the border zone 105-0 (105-1) is bridged and recorded over the L0 layer (refer to the border-out 105c-0 in FIG. 3) and the L1 layer (refer to the border-out 105c-1 in FIG. 3), the border zone which is provided with the border-out 105c-1 and the border-in 105b-1 is unnecessary because the lead-in area 101-1 already exists as the buffer area. As described above, if the border-out 105a-1 or 105c-1 is bridged and recorded over the L0 layer and the L1 layer, the border-out 105a-1 or 105c-1 in the L1 layer functions as the redundant buffer area and is unnecessary. Nevertheless, it wastes the recording capacity of the optical disc and it extends the time length for the border close process. As opposed to this, according to the information recording/reproducing apparatus in the first embodiment of the information recording apparatus of the present invention, discussed with reference to FIG. 1 to FIG. 15, if the border-out 105a-1 or 105c-1 is bridged and recorded over the L0 layer and the L1 layer, a smaller recording capacity of the layer border-out than that of the normal border-out is recorded into the L0 layer and it is efficiently or completely prevented to record the border-out 105a-1 or 105c-1 into the L1 layer. By this, it is possible to efficiently or completely prevent the border-out 105a-1 or 105c-1 from functioning as the redundant buffer area. Thus, it is possible to prevent a waste of the recording capacity of the optical disc, and also greatly reduce the time length for the border close process.

Moreover, in the first embodiment, for example, the layer border-out is not recorded in the buffer area, such as the middle area and the lead-in area, in the L0 layer. Moreover, the data structure of the buffer area is not changed. Thus, it is possible to stabilize the reproduction operation of the existing information recording/reproducing apparatus.

Flow of Recording Operation by Information Recording/Reproducing Apparatus—Second Embodiment—

Figure 16:
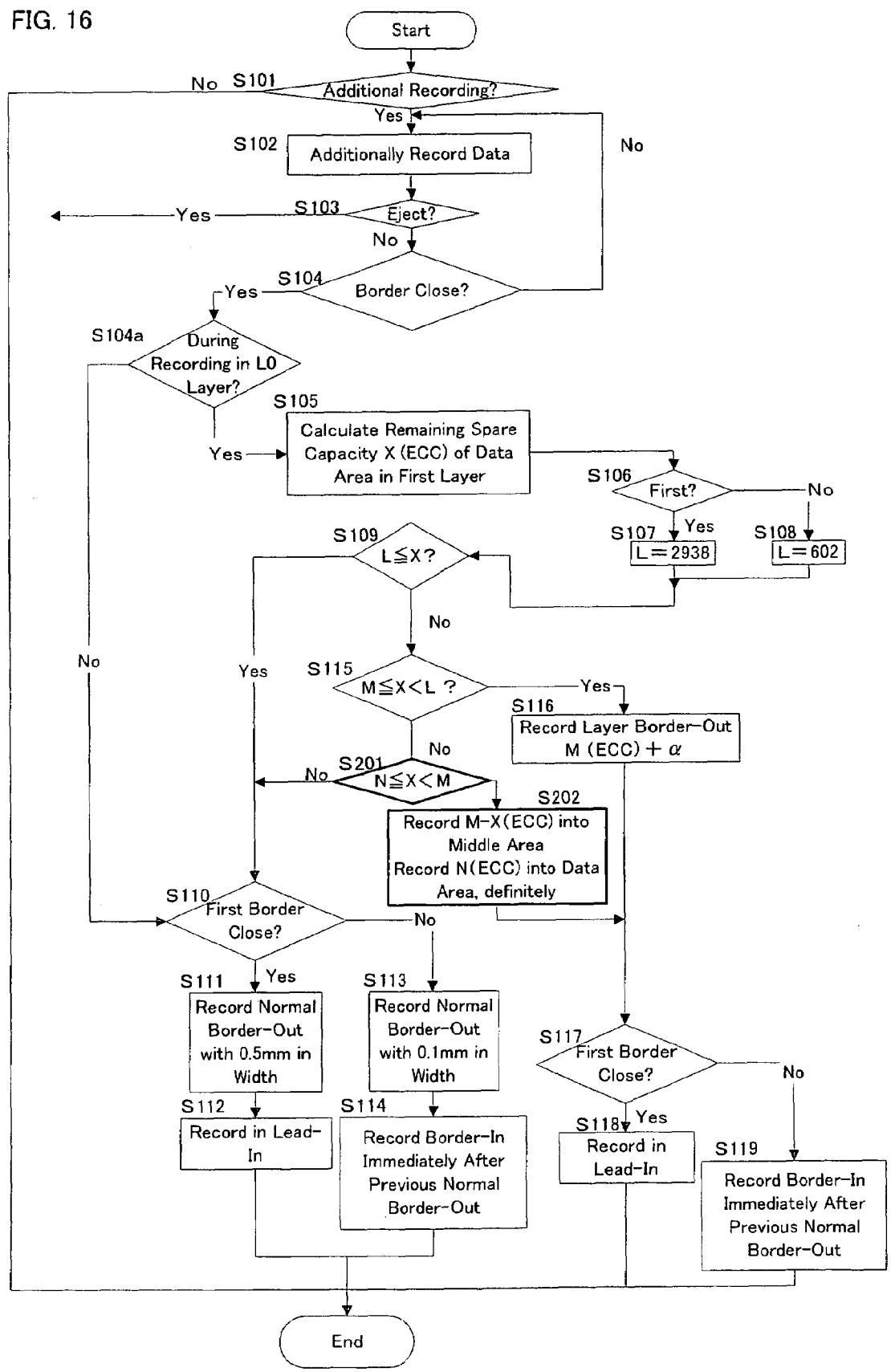
FIG. 16 is a flowchart showing a flow of the recording operation of the optical disc on the information recording/reproducing apparatus in a second embodiment of the information recording apparatus of the present invention.
Figure 17:
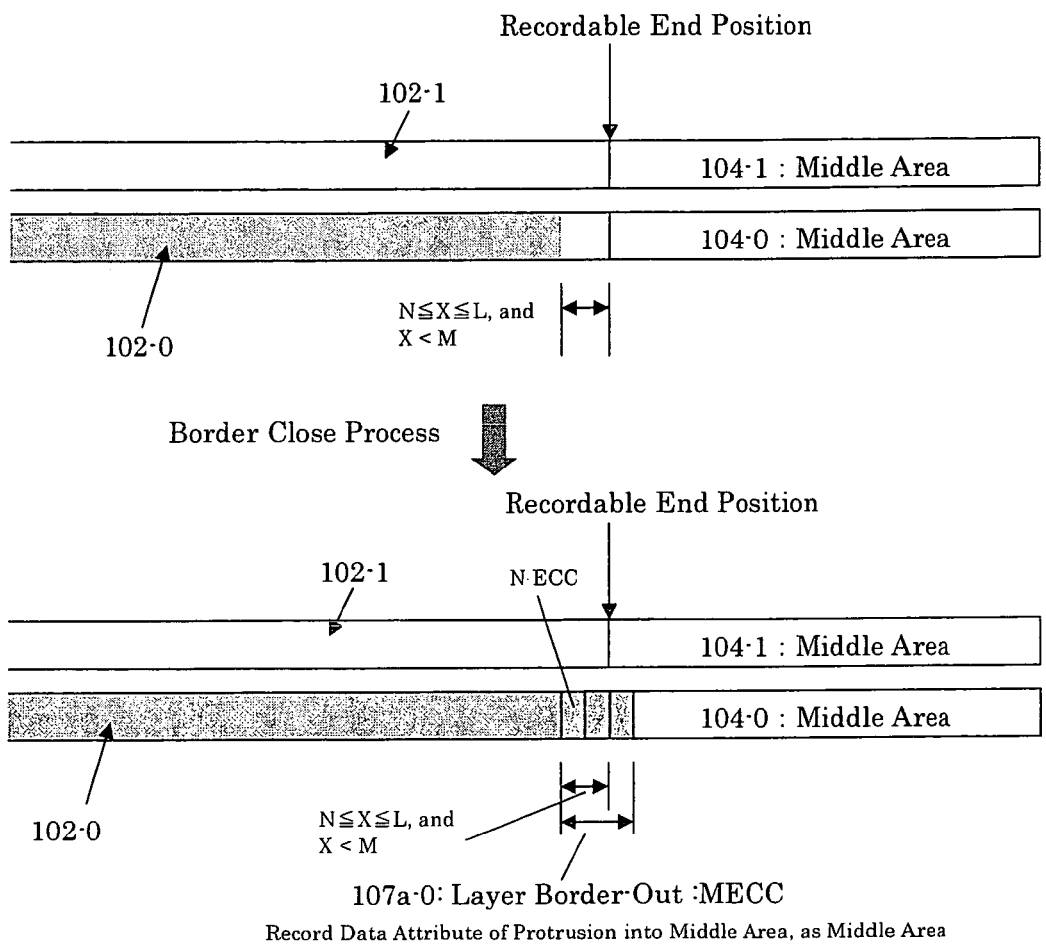
FIG. 17 is a conceptual view schematically showing the recording areas of the L0 layer and the L1 layer if the spare capacity "X" of the data area of the L0 layer is equal to or greater than "N" and less than "M", which corresponds to a step 202 in FIG. 10.
Figure 18:
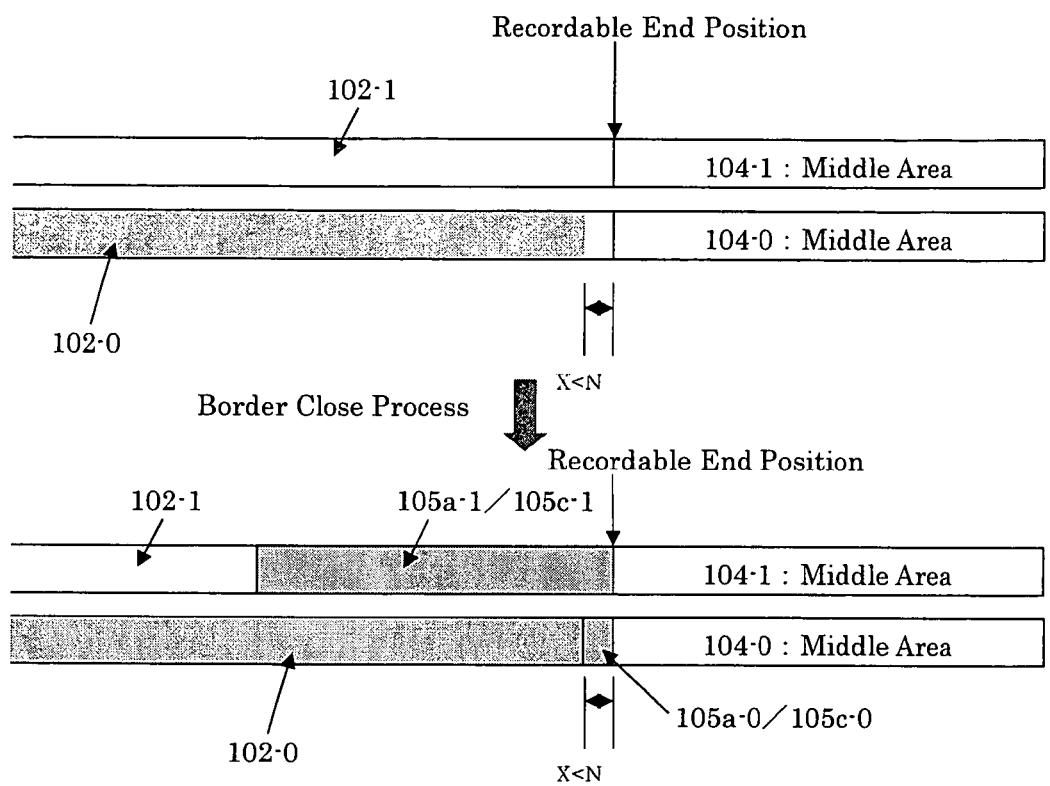
FIG. 18 is a conceptual view schematically showing the recording areas of the L0 layer and the L1 layer when the normal border close process is performed over the layers if the spare capacity "X" of the data area of the L0 layer is less than "N", which corresponds to steps S110 to S114 in FIG. 16.

Next, with reference to FIG. 16 to FIG. 18, and FIG. 11, as occasion demands, a flow of the recording operation of the optical disc on the information recording/reproducing apparatus in the second embodiment of the information recording apparatus of the present invention will be discussed in detail. FIG. 16 is a flowchart showing the flow of the recording operation of the optical disc on the information recording/reproducing apparatus in the second embodiment of the information recording apparatus of the present invention. The basic structure and operation of the second embodiment of the information recording apparatus of the present invention, and the data structure or the like of the information recording medium targeted for the recording by the information recording apparatus are substantially the same as those in the first embodiment, discussed with reference to FIG. 1 to FIG. 15. Incidentally, in FIG. 16, variables and constants, such as "X", are the same as in FIG. 10 described above, and "N" is a constant. Moreover, in FIG. 16, the same steps as those in FIG. 10, which indicates the first embodiment, carry the same step numbers, and the explanations thereof are omitted as occasion demands. FIG. 17 is a conceptual view schematically showing the recording areas of the L0 layer and the L1 layer if the spare capacity "X" of the data area of the L0 layer is equal to or greater than "N" and less than "M", which corresponds to a step S202 in FIG. 16. Incidentally, the position relationship of the inner and outer circumferential sides is the same as in FIG. 12. FIG. 18 is a conceptual view schematically showing the recording areas of the L0 layer and the L1 layer when the normal border close process is performed over the layers if the spare capacity "X" of the data area of the L0 layer is less than "N", which corresponds to steps S110 to S114 in FIG. 16. Incidentally, the position relationship of the inner and outer circumferential sides is the same as in FIG. 12.

In FIG. 16, the step S101 to the step S108 are the same as those in the first embodiment, discussed in FIG. 10 described above. Then, as in the above-mentioned first embodiment, as a result of the judgment in the step S109, if the spare capacity "X" is less than the constant "L" (the step S109: No), it is further judged whether or not the spare capacity "X" is equal to or greater than the constant "M" (e.g. "M"="43" ECC blocks) (step S115). If the spare capacity "X" is not equal to or not greater than the constant "M" (the step S115: No), it is further judged whether or not the spare capacity "X" is equal to or greater than the constant "N", which constitutes one example of the "third threshold value" of the present invention, (e.g. "5" ECC blocks) and less than the constant "M" (step S201). If the spare capacity "X" is equal to or greater than the constant "N" and less than the constant "M" (the step S201: Yes), since the spare capacity "X" is less than the constant "M" and equal to or greater than the constant "N", the layer border-out with a recording capacity of "M" ECC blocks (refer to FIG. 11(b)) is recorded in the data area and the middle area in the L0 layer. Specifically, as shown in FIG. 17, the spare capacity "X" of the L0 layer is less than the constant "M", so that the capacity of "M-X" ECC blocks, obtained by subtracting the spare capacity "X" from the constant "M", protrudes and is recorded into the middle area of the L0 layer, and the "X" ECC blocks are recorded into the data area (step S202). More specifically, the "N" ECC blocks are preferably recorded into the data area, and if the spare capacity "X" of the L0 layer is equal to the constant "N", the capacity of "M-N" ECC blocks protrudes and is recorded into the middle area. Incidentally, the data attribute of the protrusion is the same as that of the middle area.

On the other hand, if the spare capacity "X" is not equal to or not greater than the constant "N", in addition to nor less than the constant "M" (the step S201: No), since the spare capacity "X" is less than the constant "N", the normal border close process in the step S110 to the step S114 is performed, as in the first embodiment. However, in the step S111 and the step S113, more specifically, as shown in FIG. 18, the spare capacity "X" is less than the constant "N", so that the normal border-out (refer to FIG. 11(a): L="2938" or "602" ECC blocks) is bridged and recorded over the L0 layer and the L1 layer.

Consequently, in the second embodiment, for example, at least the data for recording management, such as the RMD, out of the constitutional elements of the layer border-out is recorded into the data area of the L0 layer. Moreover, for example, the next border marker and the buffer data are recorded into the buffer area, such as the middle area and the lead-out area, in the L0 layer. As described above, since at least the data for recording management is recorded into the data area of the L0 layer, there is such an advantage that it is possible to improve the reliability of the information recorded on the optical disc by the information recording apparatus.

Flow of Recording Operation by Information Recording/Reproducing Apparatus—Third Embodiment—

Figure 19:
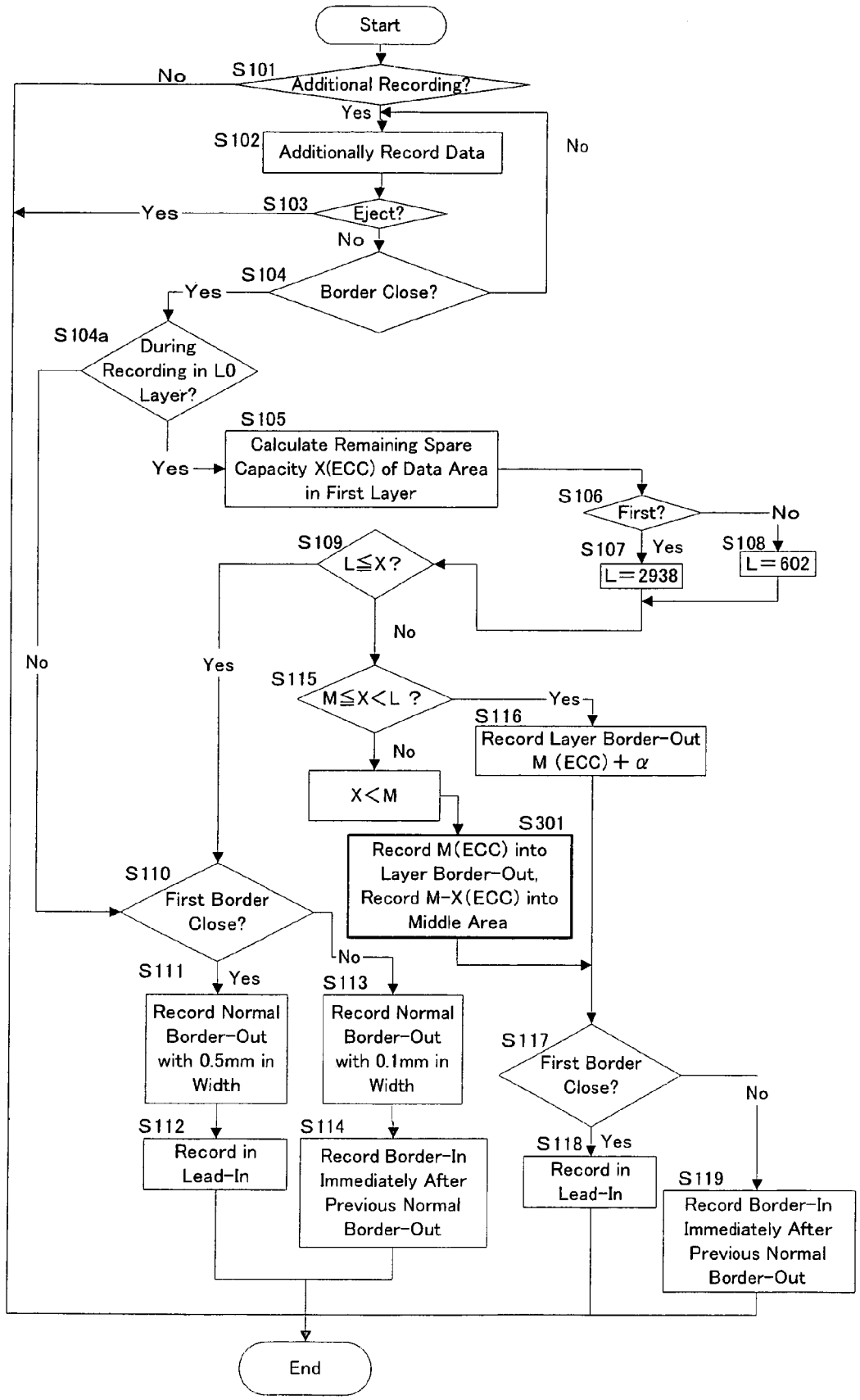
FIG. 19 is a flowchart showing a flow of the recording operation of the optical disc on the information recording/reproducing apparatus in a third embodiment of the information recording apparatus of the present invention.
Figure 20:
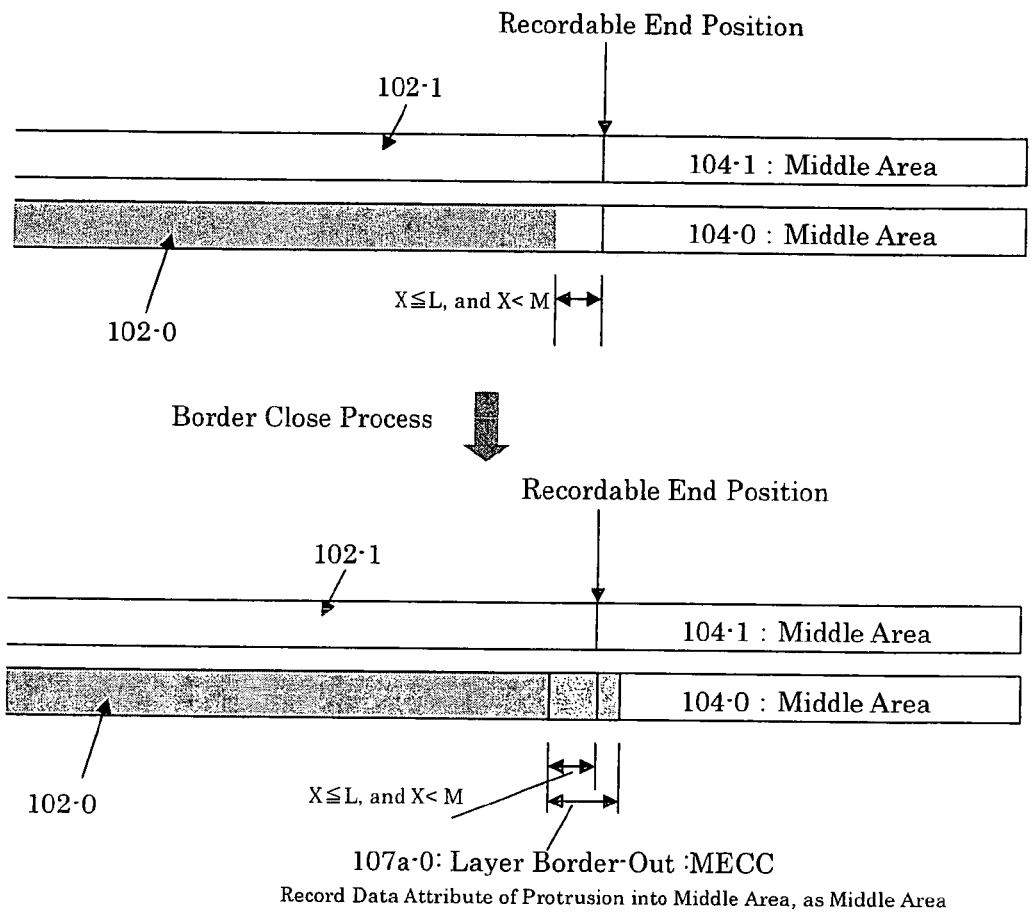
FIG. 20 is a conceptual view schematically showing the recording areas of the L0 layer and the L1 layer if the spare capacity "X" of the data area of the L0 layer is equal to or greater than "M" and less than "N", which corresponds to a step 301 in FIG. 19.

Next, with reference to FIG. 19 and FIG. 20, and FIG. 11, as occasion demands, a flow of the recording operation of the optical disc on the information recording/reproducing apparatus in the third embodiment of the information recording apparatus of the present invention will be discussed in detail. FIG. 19 is a flowchart showing the flow of the recording operation of the optical disc on the information recording/reproducing apparatus in the third embodiment of the information recording apparatus of the present invention. The basic structure and operation of the third embodiment of the information recording apparatus of the present invention, and the data structure or the like of the information recording medium targeted for the recording by the information recording apparatus are substantially the same as those in the first embodiment, discussed with reference to FIG. 1 to FIG. 15. Incidentally, in FIG. 19, variables and constants, such as "X", are the same as in FIG. 10 described above. Moreover, in FIG. 19, the same steps as those in FIG. 10, which indicates the first embodiment, carry the same step numbers, and the explanations thereof are omitted as occasion demands. FIG. 20 is a conceptual view schematically showing the recording areas of the L0 layer and the L1 layer if the spare capacity "X" of the data area of the L0 layer is equal to or greater than "M" and less than "N", which corresponds to a step 301 in FIG. 19. Incidentally, the position relationship of the inner and outer circumferential sides is the same as in FIG. 12.

In FIG. 19, the step S101 to the step S108 are the same as those in the first embodiment, discussed in FIG. 10 described above. Then, as in the above-mentioned first embodiment, as a result of the judgment in the step S109, if the spare capacity "X" is less than the constant "L" (the step S109: No), it is further judged whether or not the spare capacity "X" is equal to or greater than the constant "M" (e.g. "M"="43" ECC blocks) (the step S115). If the spare capacity "X" is not equal to or not greater than the constant "M" (the step S115: No), since the spare capacity "X" is less than the constant "M", the layer border-out with a recording capacity of "M" ECC blocks (refer to FIG. 11(b)) is recorded into the data area and the middle area of the L0 layer. Specifically, as shown in FIG. 20, the spare capacity "X" is less than the constant "M", so that the capacity of "M-X" ECC blocks, obtained by subtracting the spare capacity "X" from the constant "M", protrudes and is recorded into the middle area of the L0 layer, and the "X" ECC blocks are recorded into the data area (step S301). More specifically, if the spare capacity "X" of the L0 layer is substantially or completely equal to a "0" ECC block, all the capacity of "M" ECC blocks protrudes and is recorded into the middle area. Incidentally, the data attribute of the protrusion is the same as that of the middle area.

Consequently, according to the third embodiment in which the first and second embodiments are further improved, for example, if the border information, such as the border-out, is bridged and recorded over one recording layer and another recording layer, it is possible to substantially or completely prevent the redundancy of the function as the buffer area of the border information, such as the border-out, in the another recording layer. Specifically, in the first and second embodiments, if the spare capacity in the data area of the L0 layer is less than the minimum value of the recording capacity of second border information, such as the layer border-out, or the recording management information, such as the newest RMD, out of the constitutional elements of the layer border-out, there is a possibility that it is necessary to record the normal border out with a maximum recording capacity of "2938" or "602" ECC blocks, for example. As opposed to this, according to the third embodiment, at least the information other than the recording management information, such as the newest RMD, out of the second border information, or all the second border information is recorded into the buffer area, such as the middle area, in the L0 layer. However, a smaller recording capacity of the second border information, such as the layer border-out, than that of the first border information, such as the normal border-out, is recorded into one recording layer, and it is substantially or completely prevented to record the border information, such as the border-out, into another recording layer. By this, it is possible to efficiently or completely prevent the redundancy of the function as the buffer area of the border information, such as the border-out, in another recording layer. Thus, it is possible to greatly prevent a waste of the recording capacity of the optical disc, and also greatly reduce the time length for the border close process. As described above, it is possible to perform the border close process, most efficiently, and without waste.

In the embodiments, the information recording/reproducing apparatus for a write-once type optical disc, such as a two-layer type DVD-R, is explained as one example of the information recording apparatus. The present invention, however, is not limited to an information recording/reproducing apparatus for a rewritable type optical disc, such as a two-layer type DVD-RW. In addition, for example, it can be applied to an information recording/reproducing apparatus for a multiple layer type optical disc, such as a three layer type. Moreover, it can be applied to an information recording/reproducing apparatus for a large-capacity recording medium, such as an optical disc which uses blue laser for recording and reproduction.

The present invention is not limited to the above-described examples, and various changes may be made, if desired, without departing from the essence or spirit of the invention which can be read from the claims and the entire specification. An information recording apparatus and method, which involve such changes, are also intended to be within the technical scope of the present invention.

INDUSTRIAL APPLICABILITY

The information recording apparatus and method according to the present invention can be applied to an information recording apparatus, such as a DVD recorder. Moreover, they can be applied to an information recording apparatus or the like, which are mounted on or can be connected to various computer equipment for consumer or industrial use, for example.

The invention claimed is:

1. An information recording apparatus for recording record information onto an information recording medium having a plurality of recording layers,
    said information recording apparatus comprising:
    a writing device capable of writing the record information into the plurality of recording layers;
    a controlling device for controlling said writing device to write first border information or second border information with a smaller recording capacity than that of the first border information, at an end of the record information recorded into one recording layer of the plurality of recording layers; and
    a detecting device for detecting a spare capacity of a data area of the one recording layer,
    said controlling device controlling said writing device to write the first border information at the end if the detected spare capacity is equal to or greater than a first threshold value, and controlling said writing device to write all or part of the second border information between (i) the end and (ii) a start position of a middle area formed on an outer circumference side of the data area if the detected spare capacity is less than the first threshold value.

2. The information recording apparatus according to claim 1, wherein the first threshold value is equal to the recording capacity of the first border information.

3. The information recording apparatus according to claim 1, wherein said controlling device controls said writing device to write the first border information, bridging over a space area of the data area of the one recording layer and a data area of another recording layer of the plurality of recording layers, if the detected spare capacity is less than a second threshold value which is smaller than the first threshold value.

4. The information recording apparatus according to claim 3, wherein the second threshold value is equal to the recording capacity of the second border information.

5. The information recording apparatus according to claim 1, wherein the second border information does not include a stop block which is included in the first border information.

6. The information recording apparatus according to claim 1, wherein
    the information recording medium has two recording layers, and
    said writing device writes the record information in order, from an inner circumference to an outer circumference of one recording layer, which is on a light emission side, out of the two recording layers, and writes the record information in order, from an inner circumference to an outer circumference of the other recording layer, which is on a rear of the light emission side.

7. The information recording apparatus according to claim 6, wherein the one recording layer is the recording layer which is on the light emission side.

8. The information recording apparatus according to claim 1, wherein the second border information is one portion of the first border information.

9. An information recording method in an information recording apparatus comprising a writing device capable of writing record information into a plurality of recording layers with respect to an information recording medium having the plurality of recording layers,
    said information recording method comprising:
    a controlling process of controlling said writing device to write first border information or second border information with a smaller recording capacity than that of the first border information, at an end of the record information recorded into one recording layer of the plurality of recording layers; and
    a detecting process of detecting a spare capacity of a data area of the one recording layer,
    said controlling process controlling said writing device to write the first border information at the end if the detected spare capacity is equal to or greater than a first threshold value, and controlling said writing device to write all or part of the second border information between (i) the end and (ii) a start position of a middle area formed on an outer circumference side of the data area if the detected spare capacity is less than the first threshold value.

* * * * *